United States Patent
Islam et al.

(10) Patent No.: US 10,531,384 B2
(45) Date of Patent: Jan. 7, 2020

(54) SCHEDULING REQUEST COLLECTION AFTER A DISCONTINUOUS RECEPTION PERIOD

(71) Applicant: QUALCOMM Incorporated, San Diego, CA (US)

(72) Inventors: Muhammad Nazmul Islam, Edison, NJ (US); Junyi Li, Chester, NJ (US); Sundar Subramanian, Bridgewater, NJ (US); Juergen Cezanne, Ocean Township, NJ (US); Tao Luo, San Diego, CA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 15/371,795

(22) Filed: Dec. 7, 2016

(65) Prior Publication Data

US 2017/0289910 A1    Oct. 5, 2017

Related U.S. Application Data

(60) Provisional application No. 62/318,212, filed on Apr. 5, 2016.

(51) Int. Cl.
*H04W 52/02* (2009.01)
*H04W 72/04* (2009.01)
(Continued)

(52) U.S. Cl.
CPC ... *H04W 52/0225* (2013.01); *H04W 72/0446* (2013.01); *H04W 74/0833* (2013.01);
(Continued)

(58) Field of Classification Search
CPC ......... H04W 52/0225; H04W 52/0216; H04W 72/0446; H04W 74/0833; H04W 72/1284;
(Continued)

(56) References Cited

U.S. PATENT DOCUMENTS 8,175,050 B2    5/2012  Meylan
9,042,238 B1    5/2015  Kim
(Continued)

FOREIGN PATENT DOCUMENTS

EP    2076087 A2    7/2009
GB    2503509 A  *  1/2014   ........ H04W 52/0216
(Continued)

OTHER PUBLICATIONS

Bontu C., et al., "DRX Mechanism for Power Saving in LTE," IEEE Communications Magazine, IEEE Service Center, Piscataway, US, vol. 47 (6), Jun. 1, 2009 (Jun. 1, 2009), pp. 48-55, XP011281824, ISSN: 0163-6804, DOI: DOI:10.1109/MCOM.2009.5116800.
(Continued)

*Primary Examiner* — Brian T O Connor
(74) *Attorney, Agent, or Firm* — Holland & Hart LLP

(57) ABSTRACT

A wireless device configured for discontinuous reception (DRX) may and operating in a system that uses directional beamforming may identify a random access time period after awaking from a DRX sleep mode. The device may then transmit a scheduling request during the random access time period. In some cases, the device may transmit the scheduling request using frequency resources also associated with random access transmissions. In other cases, the device may utilize resources that are not associated with random access. The determination of which frequency resources are used may depend on the length of the DRX. That is, if a device has been in a sleep mode for a long time, it may use random (Continued)

access frequency resources that are associated with a more robust transmission configuration.

68 Claims, 21 Drawing Sheets

(51) Int. Cl.
*H04W 74/08* (2009.01)
*H04W 56/00* (2009.01)
*H04W 74/00* (2009.01)
*H04W 24/08* (2009.01)

(52) U.S. Cl.
CPC ........ *H04W 24/08* (2013.01); *H04W 56/0025* (2013.01); *H04W 72/042* (2013.01); *H04W 74/008* (2013.01)

(58) Field of Classification Search
CPC .............. H04W 72/042; H04W 24/08; H04W 56/0025; H04W 74/008; H04W 76/28; Y02D 70/21; Y02D 70/142; Y02D 70/1242; Y02D 70/24; Y02D 70/1262; Y02D 70/146; Y02D 70/00; Y02D 70/122; Y02D 70/1264
See application file for complete search history.

(56) References Cited

U.S. PATENT DOCUMENTS

| | | | |
|---|---|---|---|
| 9,198,128 B2 | 11/2015 | Kim et al. | |
| 9,872,333 B2* | 1/2018 | Cili | H04L 67/325 |
| 2010/0008236 A1 | 1/2010 | Zhang et al. | |
| 2012/0281679 A1* | 11/2012 | Fan | H04W 74/008 370/336 |
| 2013/0223307 A1 | 8/2013 | Ohlsson et al. | |
| 2015/0334656 A1* | 11/2015 | Ji | H04W 52/0245 370/252 |
| 2016/0212631 A1 | 7/2016 | Shen et al. | |
| 2016/0295504 A1* | 10/2016 | Wang | H04W 52/02 |
| 2017/0048842 A1* | 2/2017 | Han | H04W 52/0216 |
| 2017/0201963 A1* | 7/2017 | Zhang | H04W 68/02 |
| 2017/0273136 A1* | 9/2017 | Siomina | H04W 52/0216 |
| 2017/0325057 A1* | 11/2017 | Zhang | H04W 4/02 |
| 2017/0332349 A1* | 11/2017 | Sundberg | H04L 1/0009 |
| 2018/0049269 A1* | 2/2018 | Fujishiro | H04W 76/28 |
| 2018/0092158 A1* | 3/2018 | Lee | H04W 76/20 |
| 2018/0124864 A1* | 5/2018 | Lee | H04W 52/0216 |
| 2018/0310283 A1* | 10/2018 | Deenoo | H04W 72/042 |

FOREIGN PATENT DOCUMENTS

| | | |
|---|---|---|
| WO | WO-2015025838 A1 | 2/2015 |
| WO | WO-2015178566 A1 | 11/2015 |

OTHER PUBLICATIONS

ISA/EP, International Search Report and Written Opinion of the International Searching Authority, Int'l Application No. PCT/US2017/024223, dated Jul. 4, 2017, European Patent Office, Rijswijk, NL, 17 pgs.

* cited by examiner

SCHEDULING REQUEST COLLECTION AFTER A DISCONTINUOUS RECEPTION PERIOD

CROSS REFERENCES

The present application for patent claims priority to U.S. Provisional Patent Application No. 62/318,212 by Islam, et al., entitled "Scheduling Request Collection After A Discontinuous Reception Period," filed Apr. 5, 2016, assigned to the assignee hereof.

BACKGROUND

The following relates generally to wireless communication, and more specifically to scheduling request (SR) collection after a discontinuous (DRX) period.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In wireless systems, a base station may allocate resources to a UE for uplink and downlink transmissions. When a UE has data to transmit on the uplink, the UE may transmit a scheduling request for uplink resources from the base station. In some cases, a base station may grant the resource allocation with a scheduling grant on the physical downlink control channel (PDCCH). The base station may also allocate resources in the physical uplink control channel (PUCCH) (i.e., for the UE to provide downlink transmission feedback), and these PUCCH resources may also be used for transmission of a scheduling request.

In some cases, a UE may enter a low power state as part of a DRX configuration. In the case of DRX, a UE may monitor the PDCCH for scheduling grants while in an active mode, but may stop monitoring PDCCH in a sleep mode to conserve battery power. A UE in a DRX sleep mode that is operating in millimeter wave (mmW) spectrum may not receive PDCCH transmissions (and hence, an uplink resource allocation) because the transmissions may be directional.

That is, wireless devices operating in mmW spectrum may utilize beamforming to increase the strength of wireless signals. In such cases, a base station may transmit PDCCH to UEs currently in a DRX active mode using directional beams. Accordingly, a wireless device configured for DRX operating in a mmW spectrum may be prevented from transmitting a scheduling request to a base station.

SUMMARY

A wireless device configured for discontinuous reception (DRX) may be operating in a system that uses directional beamforming and may identify a random access time period after awaking from a DRX sleep mode. The device may then transmit a scheduling request during the random access time period. In some cases, the device may transmit the scheduling request using frequency resources also associated with random access transmissions. In other cases, the device may utilize resources that are not associated with random access. The determination of which frequency resources are used may depend on the length of a time period of the DRX. That is, if a device has been in a sleep mode for a long time, it may use random access frequency resources that are associated with a more robust transmission configuration.

A method of wireless communication is described. The method may include entering a sleep mode of a DRX configuration, identifying that a scheduling request is to be transmitted to a base station, identifying a time period associated with a random access channel (RACH) and transmitting the scheduling request to the base station during the time period associated with the RACH.

An apparatus for wireless communication is described. The apparatus may include means for entering a sleep mode of a DRX configuration, means for identifying that a scheduling request is to be transmitted to a base station, means for identifying a time period associated with a RACH and means for transmitting the scheduling request to the base station during the time period associated with the RACH.

A further apparatus is described. The apparatus may include a processor, memory in electronic communication with the processor, and instructions stored in the memory. The instructions may be operable to cause the apparatus to enter a sleep mode of a DRX configuration, identify that a scheduling request is to be transmitted to a base station, identify a time period associated with a RACH and transmit the scheduling request to the base station during the time period associated with the RACH.

A non-transitory computer readable medium for wireless communication is described. The non-transitory computer-readable medium may include instructions to cause a processor to enter a sleep mode of a DRX configuration, identify that a scheduling request is to be transmitted to a base station, identify a time period associated with a RACH and transmit the scheduling request to the base station during the time period associated with the RACH.

A further method is described. The method may include entering a sleep mode of a DRX configuration, identifying that a scheduling request is to be transmitted to a base station, receiving a directional synchronization subframe from the base station, and transmitting the scheduling request to the base station using resources based at least in part on the received directional synchronization subframe.

A further apparatus is described. The apparatus may include a processor, memory in electronic communication with the processor, and instructions stored in the memory. The instructions may be operable to cause the apparatus to enter a sleep mode of a DRX configuration, identify that a scheduling request is to be transmitted to a base station, receive a directional synchronization subframe from the base station, and transmit the scheduling request to the base station using resources based at least in part on the received directional synchronization subframe.

Some examples of the method, apparatus, or non-transitory computer-readable medium described above may further include processes, features, means, or instructions for entering an active mode of the DRX configuration, where the scheduling request is transmitted during the active mode. Some examples of the method, apparatus, or non-transitory computer-readable medium described above may further include processes, features, means, or instructions for receiving a directional synchronization subframe from the base station, where a resource associated with the scheduling request is identified based on the received directional synchronization subframe. In some examples of the method, apparatus, or non-transitory computer-readable medium described above, the resource associated with the scheduling request is a symbol index, a set of subcarriers, or a combination thereof. Some examples of the method, apparatus, or non-transitory computer-readable medium described above may further include processes, features, means, or instructions for receiving a directional synchronization subframe from the base station, wherein a resource associated with the RACH is identified based at least in part on the received directional synchronization subframe.

Some examples of the method, apparatus, or non-transitory computer-readable medium described above may further include processes, features, means, or instructions for identifying the directional synchronization subframe from a set of directional subframes transmitted by the base station based on a signal strength of the directional synchronization subframe.

Some examples of the method, apparatus, or non-transitory computer-readable medium described above may further include processes, features, means, or instructions for selecting at least one of a random cyclic shift, a random set of subcarriers, or a random sequence, where the scheduling request is transmitted using the random cyclic shift, the random set of subcarriers, the random sequence, or combinations thereof.

Some examples of the method, apparatus, or non-transitory computer-readable medium described above may further include processes, features, means, or instructions for receiving an indication of at least one of a cyclic shift, a set of subcarriers, or a sequence index from the base station, where the scheduling request is transmitted using the cyclic shift, the set of sub carriers, the sequence index, or combinations thereof.

Some examples of the method, apparatus, or non-transitory computer-readable medium described above may further include processes, features, means, or instructions for identifying a frequency region associated with the RACH, where the scheduling request is transmitted using resources located within the frequency region associated with the RACH. Some examples of the method, apparatus, or non-transitory computer-readable medium described above may further include processes, features, means, or instructions for determining that a length of a sleep period of the DRX configuration is greater than a threshold, where the scheduling request is transmitted using the resources located within the frequency region associated with the RACH based on the determination that the length of the sleep period is greater than the threshold.

Some examples of the method, apparatus, or non-transitory computer-readable medium described above may further include processes, features, means, or instructions for identifying a frequency region associated with the RACH and a frequency region associated with scheduling requests that does not overlap with the frequency region associated with the RACH, where the scheduling request is transmitted using resources located within the frequency region associated with scheduling requests based on a sleep period of the DRX configuration.

Some examples of the method, apparatus, or non-transitory computer-readable medium described above may further include processes, features, means, or instructions for determining that a length of the sleep period is less than a threshold, where the scheduling request is transmitted using the resources located within the frequency region associated with scheduling requests based on the determination that the length of the sleep period is less than the threshold.

A method of wireless communication is described. The method may include configuring a user equipment (UE) with a DRX configuration, identifying a time period associated with a RACH following a sleep period of the DRX configuration and receiving a scheduling request from the UE during the time period associated with the RACH.

An apparatus for wireless communication is described. The apparatus may include means for configuring a UE with a DRX configuration, means for identifying a time period associated with a RACH following a sleep period of the DRX configuration and means for receiving a scheduling request from the UE during the time period associated with the RACH.

A further apparatus is described. The apparatus may include a processor, memory in electronic communication with the processor, and instructions stored in the memory. The instructions may be operable to cause the processor to configure a UE with a DRX configuration, identify a time period associated with a RACH following a sleep period of the DRX configuration and receive a scheduling request from the UE during the time period associated with the RACH.

A non-transitory computer readable medium for wireless communication is described. The non-transitory computer-readable medium may include instructions to cause a processor to configure a UE with a DRX configuration, identify a time period associated with a RACH following a sleep period of the DRX configuration and receive a scheduling request from the UE during the time period associated with the RACH.

A further method is described. The method may include configuring a UE with a DRX configuration, transmitting a directional synchronization subframe, and receiving a scheduling request from the UE on resources based at least in part on the transmitted directional synchronization subframe.

A further apparatus is described. The apparatus may include a processor, memory in electronic communication with the processor, and instructions stored in the memory. The instructions may be operable to cause the processor to configure a UE with a DRX configuration, transmit a directional synchronization subframe, and receive a scheduling request from the UE on resources based at least in part on the transmitted directional synchronization subframe.

Some examples of the method, apparatus, or non-transitory computer-readable medium described above may further include processes, features, means, or instructions for transmitting a directional synchronization subframe to the UE, where the time period associated with the RACH is associated with the received directional synchronization subframe.

Some examples of the method, apparatus, or non-transitory computer-readable medium described above may further include processes, features, means, or instructions for transmitting an indication of at least one of a cyclic shift, a set of subcarriers, or a sequence index to the UE, where the scheduling request is received using the cyclic shift, the set of subcarriers, the sequence index, or combinations thereof.

Some examples of the method, apparatus, or non-transitory computer-readable medium described above may further include processes, features, means, or instructions for identifying a frequency region associated with the RACH, where the scheduling request is received using resources located within the frequency region associated with the RACH.

Some examples of the method, apparatus, or non-transitory computer-readable medium described above may further include processes, features, means, or instructions for identifying a frequency region associated with the RACH and a frequency region associated with scheduling requests that does not overlap with the frequency region associated with the RACH, where the scheduling request is transmitted using resources located within the frequency region associated with scheduling requests based on the sleep period of the DRX configuration.

DETAILED DESCRIPTION

Figure 1:
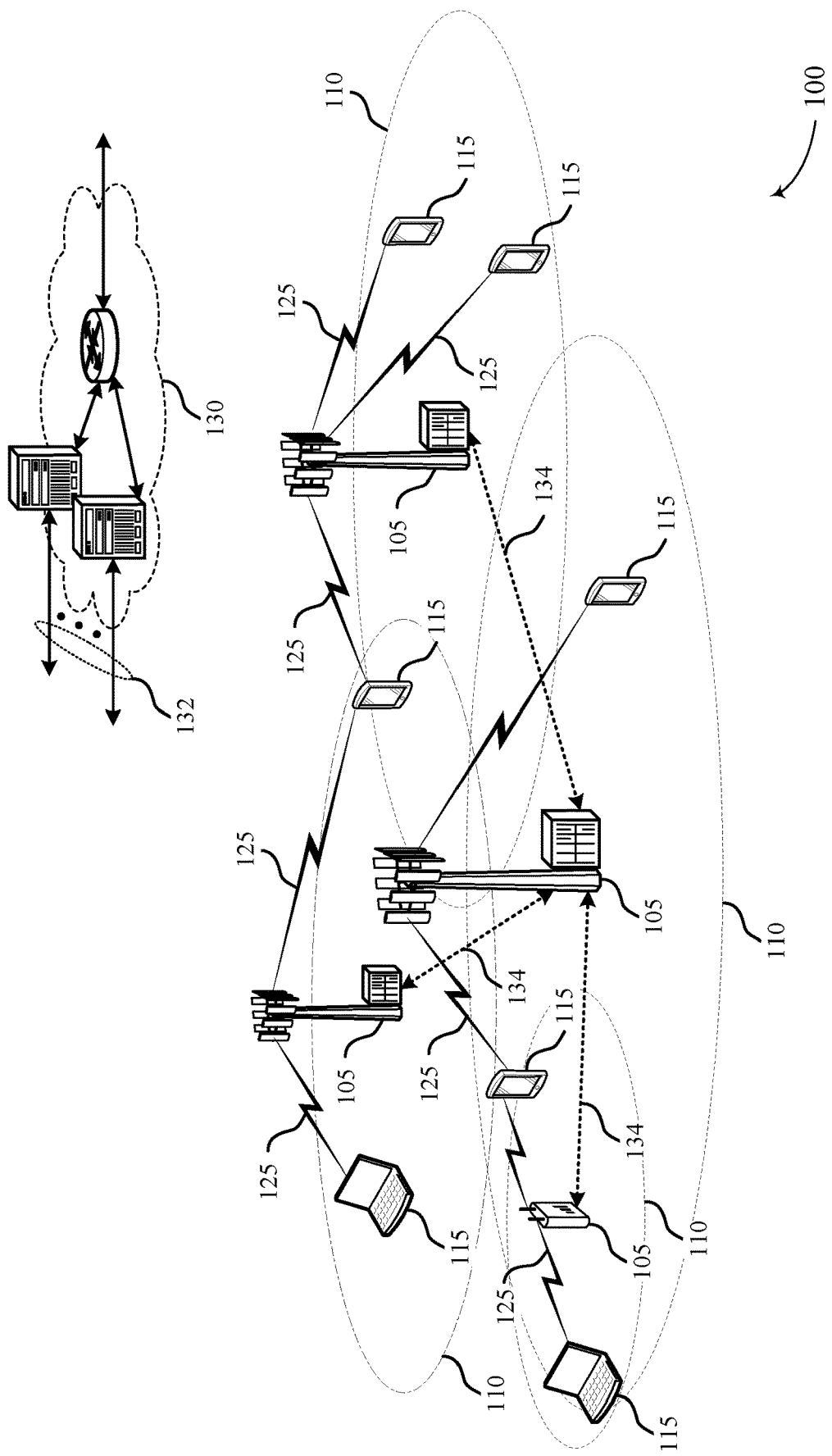
FIG. 1 illustrates an example of a wireless communications system that supports scheduling request (SR) collection after a discontinuous (DRX) period in accordance with aspects of the present disclosure.

In some wireless systems, a base station may need to schedule uplink (UL) resources to a user equipment (UE) before the UE can transmit data to the base station. The base station may periodically allocate resources in the physical uplink control channel (PUCCH) so that a UE can request UL resources via a scheduling request (SR). In response to a scheduling request, a base station may grant the resource allocation on the physical downlink control channel (PDCCH). Accordingly, a UE may monitor the PDCCH for scheduling grants from the base station.

A UE may use a discontinuous reception (DRX) configuration to conserve power. While in a DRX configuration, the UE discontinuously monitors the PDCCH by switching between active and sleep modes. During sleep mode, the UE may stop monitoring the PDCCH for a sleep period and power down some of its circuitry, while during active mode, the UE may monitor the PDCCH for transmissions such as scheduling grants.

Some wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

In mmW systems, synchronization signals may be beamformed to meet a certain link budget (e.g., an accounting of gains and losses associated with transmitters and receivers when communicating over a medium). In such cases, base stations may use multiple antenna ports connected to sub-arrays of antennas to form the beams in various directions using a number of analog weight factors. A base station may thus transmit synchronization symbols in multiple directions, where the direction may change in each symbol of a synchronization subframe.

When using beamforming techniques, the base station may transmit the PDCCH only to UEs currently in an active mode. As such, a UE currently in sleep mode or recently returning from sleep mode may be unable to receive PDCCH transmissions and therefore may be unaware of allocated resources available for transmission of a scheduling request. Accordingly, a UE in a mmW system returning from a DRX sleep period may be unable to send a scheduling request to a base station.

In accordance with aspects of the present disclosure, instead of transmitting a scheduling request over the PUCCH on resources allocated by a base station, the UE may transmit the scheduling request during a random access channel (RACH) sub-frame (e.g., during a RACH period). In some examples, the UE may receive a directional synchronization subframe (e.g., beam) from the base station and may determine the RACH time period based on the received directional synchronization beam. The UE may select the directional subframe from a set of directional subframes transmitted by the base station based on a signal strength of the subframes. In some cases, the UE selects the synchronization subframe with the strongest signal.

In yet other examples, the UE may receive a directional synchronization subframe (e.g., beam) from the base station and may transmit the scheduling request to the base station using resources based on the received directional synchronization subframe. In some cases, the scheduling request is transmitted on resources other than those associated with RACH.

Aspects of the disclosure are initially described in the context of a wireless communication system. Further examples are then described for transmitting a scheduling request during a time period associated with a RACH. Aspects of the disclosure are further illustrated by and described with reference to apparatus diagrams, system diagrams, and flowcharts that relate to SR collection after a DRX period.

FIG. 1 illustrates an example of a wireless communications system 100 in accordance with various aspects of the present disclosure. The wireless communications system 100 includes base stations 105, UEs 115, and a core network 130. Wireless communications system 100 may support scheduling request transmissions using a time period (and, in some cases, frequency resources) associated with a random access procedure.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. In some cases, UE or base station antennas may be located within one or more antenna arrays. For example, one or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Wireless communications system 100 may operate in an ultra-high frequency (UHF) frequency or mmW region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum.

In some cases, a UE 115 may monitor a communication links 125 continuously for an indication that the UE 115 may receive data. In other cases (e.g., to conserve power and extend battery life) a UE 115 may be configured with a DRX cycle. A DRX cycle consists of an "On Duration" when the UE 115 may monitor for control information (e.g., on PDCCH) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

UEs 115 may use random access procedures to establish a connection and communicate with a network. For example, a UE 115 may determine that it has data to send and use random access procedures to initiate a data transfer with a base station. In some cases, one or more UEs 115 may seek resources to send data and subsequently transmit a random access sequence or preamble to the base station. The base station may detect the random access sequence transmissions from the one or more UEs 115 and assign resources for communication.

A random access message transmission may be based on a synchronization signal received from a base station. For example, the transmission of synchronization symbols from a base station may be used by a UE 115 to identify timing and/or frequency resources to send the random access message. In some mmW systems, synchronization signals may be beam-formed. Base stations may use multiple antenna ports connected to subarrays of antennas to form beams in various directions using a number of analog weight factors. A base station 105 may thus transmit the synchronization symbol in multiple directions, where the direction may change in each symbol of a synchronization subframe.

A UE 115 may transmit a random access message to a base station 105 using multiple symbols. The random access message may include repetitions of a random access sequence weighted by a spreading code. For example, a random access sequence may be weighted using different elements of the spreading code, where a first repetition may be weighted with a first element and a second repetition may be weighted using a second element. The weighted random access signals may be spread over multiple symbols and transmitted to the base station as the random access message. In some cases, a spreading code may include values of one and negative one, may be based on rows of a Hadamard matrix, or may correspond to a number of symbols used to transmit the random access message.

Thus, a UE 115 that wishes to obtain access to wireless communications system 100, or that is awaking from a DRX sleep mode, may receive a synchronization subframe from a base station 105. A synchronization subframe may indicate time and frequency resources to be used for random access procedures. In some cases, subframes designated for random access messages may use symbols that are relatively longer than the symbols in data subframes to meet a link budget (e.g., an accounting of gains and losses associated with transmitters and receivers when communicating over a medium). Some wireless communications systems may extend the duration of random access symbols through fractional tone spacing, where the symbol duration may also change with the tone spacing based on an inversely proportional relationship. For example, a tone spacing may be reduced from 15 kHz to 1.25 kHz corresponding to a symbol duration change from 66.67 μs to 800 μs. The different tone spacing may only be applied to random access subframes, which may result in complex implementation in a wireless system.

Figure 2:
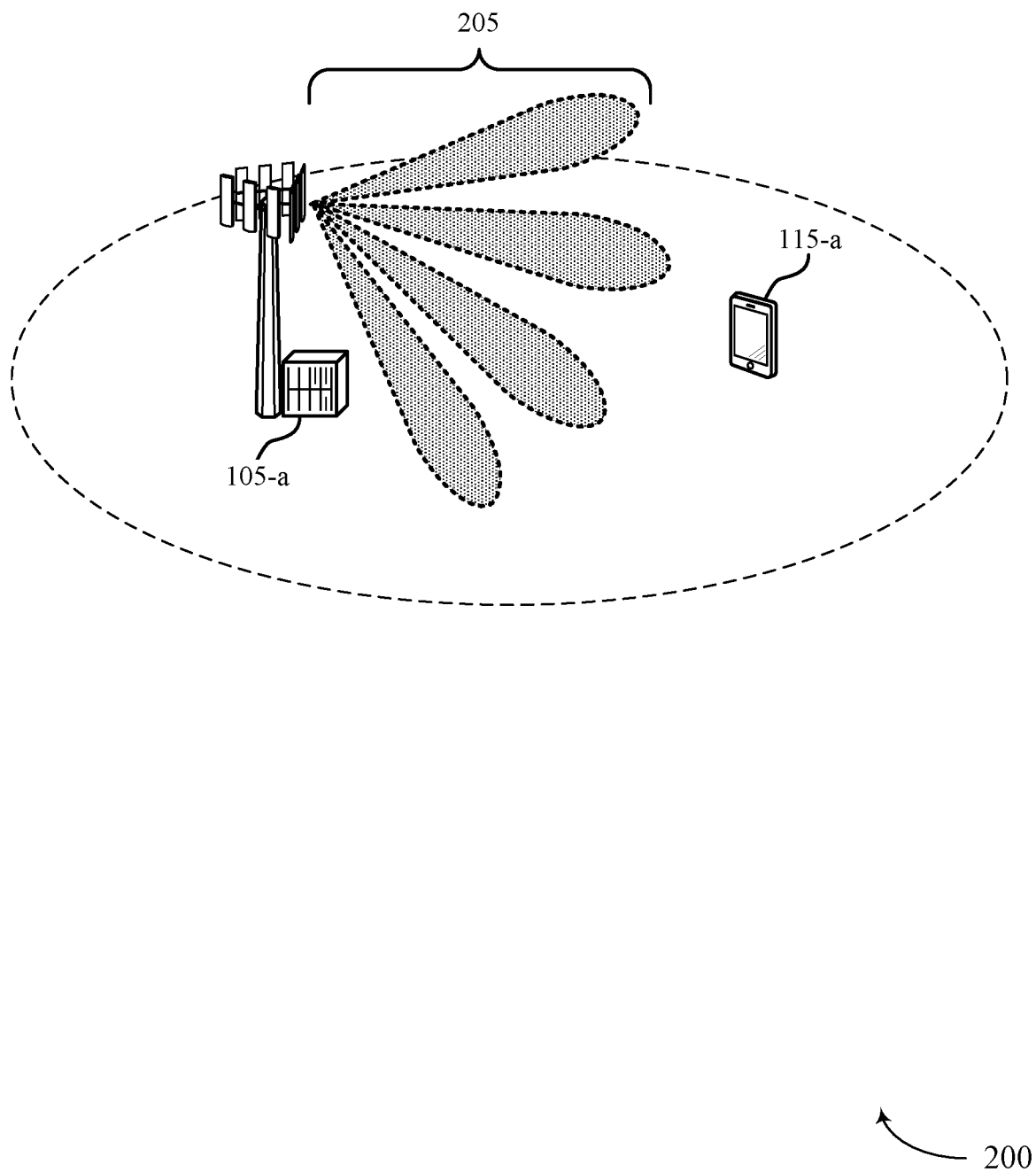
FIG. 2 illustrates an example of a wireless communications system that supports SR collection after a DRX period in accordance with aspects of the present disclosure.

FIG. 2 illustrates an example of a wireless communications system 200 for SR collection after a DRX period. Wireless communications system 200 may include base station 105-a and UE 115-a, which may be examples of the corresponding devices described with reference to FIG. 1. Base station 105-a and UE 115-a may communicate using directional beams 205. Wireless communications system 200 may support scheduling request transmissions using a time period (and, in some cases, frequency resources) associated with a random access procedure.

Wireless communications system 200 may utilize synchronization signals that may be beam-formed to meet a certain link budget (e.g., an accounting of gains and losses associated with transmitters and receivers when communicating over a medium). For example, base station 105-a may use multiple antenna ports connected to subarrays of antennas to form beams in various directions using a number of analog weighting factors. Base station 105-a may thus transmit synchronization symbols in multiple directions, where the directions may change in each symbol of a synchronization subframe.

UE 115-a may use random access procedures to establish a connection and communicate with a network. For example, UE 115-a may determine that it has data to send and use random access procedures to initiate a data transfer with a base station. In some cases, UE 115-a may seek resources to send data and subsequently transmit a random access sequence or preamble to base station 105-a. Base station 105-a may detect the random access sequence transmissions from UE 115-a and assign resources for communication. Random access message transmissions may be based on the synchronization signal received from a base station. That is, the transmission of synchronization symbols from a base station may be used by UE 115-a to identify timing and/or frequency resources to send the random access message.

In some cases, UE 115-a may identify a specific beam associated with a synchronization signal (e.g., a beam with the highest SNR) and further identify a symbol during which that beam was transmitted (e.g., using a symbol index). UE 115-a may then select a number of symbols based on a symbol index to transmit a random access message based on the symbol associated with the synchronization beam. For example, UE 115-a may determine a synchronization beam was transmitted during a first symbol and may correspondingly transmit the random access message during the first two symbols of a random access subframe. A different UE 115 may identify a second synchronization beam and transmit a random access message on different symbols. If both UEs 115 identify the same synchronization beam (transmitted during the same symbol) they may attempt to transmit the random access message using the same resources. However, when random access messages are spread over multiple symbols of a random access subframe, the base station may differentiate between the UEs 115 and proceed to assign resources. In some examples, UE 115-a may randomly select a subcarrier of a radio frequency band or randomly select a component carrier to transmit the random access message.

When using beamforming techniques, base station 105-a may transmit the PDCCH only to UEs 115 currently in an active mode. As such, a UE 115 currently in sleep mode or recently returning from sleep mode may be unable to receive PDCCH transmissions and may be therefore unaware of allocated resources available for transmission of a scheduling request. Accordingly, a UE 115 in a mmW system returning from a DRX sleep period (e.g., UE 115-a) may be unable to send a scheduling request to a base station.

Instead of transmitting a scheduling request over the PUCCH on resources allocated by base station 105-a, UE 115-a may transmit the scheduling request during a random access channel (RACH) sub-frame. For example, UE 115-a may identify a time period associated with a RACH and transmit the scheduling request to the base station during the RACH time period. In certain cases, UE 115-a may transmit the scheduling request on subcarriers that are reserved for RACH transmissions. Additionally or alternatively, UE 115-a may transmit the scheduling request on subcarriers reserved for transmissions other than RACH transmissions. In some cases, UE 115-a may use the length of the DRX sleep period to determine if UE 115-a should transmit the scheduling request in subcarriers that are reserved for RACH transmissions.

In some cases, UE 115-a may use a synchronization signal received from base station 105-a to transmit the scheduling request. For example, UE 115-a may use a particular synchronization beam (e.g., a beam with the highest signal strength) to find the symbol index for transmitting the scheduling request. The UE 115-a may use the synchronization signal to identify resources (e.g., a time period, a symbol index, a set of subcarriers) associated with the RACH and/or the scheduling request. In some cases, UE 115-a may transmit the scheduling request based on the synchronization signal on resources other than those associated with RACH. In some examples, base station 105-a may assign a cyclic shift and subcarrier region to UE 115-a to transmit the scheduling request.

Figure 3:
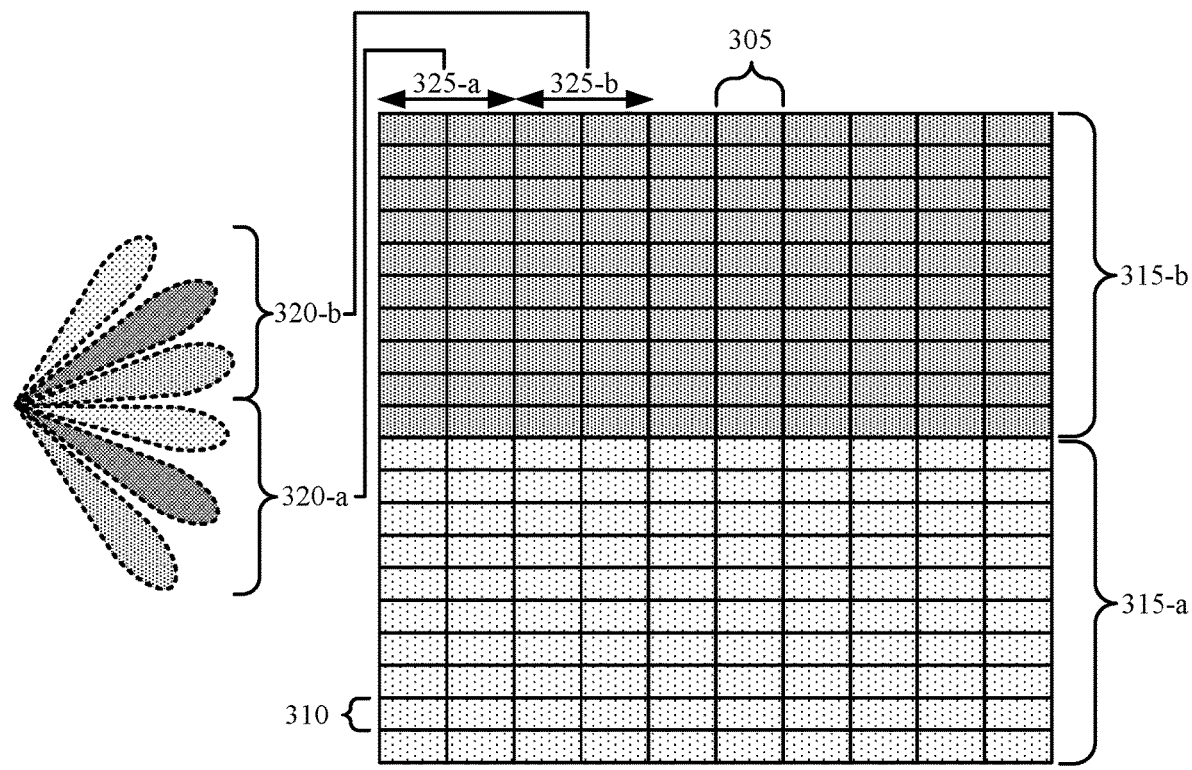
FIG. 3 illustrates an example of a random access channel (RACH) subframe that supports SR collection after a DRX period in accordance with aspects of the present disclosure.

FIG. 3 illustrates an example of a RACH subframe 300 in a system that supports scheduling request transmission to request resources for a BSR. In some cases, RACH subframe 300 may represent aspects of techniques performed by a UE 115 or base station 105 as described with reference to FIGS. 1-2. RACH subframe 300 may illustrate an example of the transmission of a scheduling request during a RACH time period to enable efficient uplink resource allocation.

RACH subframe 300 may include multiple symbols 305 and subcarriers 310 used by a UE 115 for the transmission of various signals. In some cases, RACH subframe 300 may include different radio frequency regions 315, where each frequency region my include multiple subcarriers 310. In some cases, these radio frequency regions 315 may be associated with different types of transmissions. For example, a first radio frequency region 315-a may be used for a random access message transmissions, where a random access message may be transmitted using, or spread across, multiple symbols 305. A second radio frequency region 315-b may be used for the transmission of signals that are not associated with random access processes.

In an example, the second radio frequency region 315-b may be used for the transmission of scheduling requests during the same RACH time period. For example, a UE 115 may use a set of subcarriers 310 in the second radio frequency region 315-b to transmit a scheduling request over multiple symbols 305 while the first radio frequency region 315-b may be reserved for RACH preamble transmissions. The first radio frequency region 315-b and the second radio frequency region 315-b may not overlap.

In some cases, a UE 115 may use a synchronization beam to identify a symbol index to transmit the scheduling request. For example, multiple synchronization beams may be sent by a base station 105. A first subset of synchronization beams 320-a may be identified by the UE 115 and a symbol index may be used to send a first scheduling request over a first symbol group 325-a. Similarly, a second subset of synchronization beams 320-b may provide a different symbol index, and the UE 115 may transmit the scheduling request using a second symbol group 325-b. In some cases, a certain synchronization beam (e.g., a beam within either the first subset of synchronization beams 320-a or the second subset of synchronization beams 320-b) may be identified by the UE 115 and used to identify the symbol index. In some cases, the beam may be identified as having the greatest signal-to-noise ratio (SNR). Additionally or alternatively, the base station 105 may also provide the UE with a cyclic shift and a subcarrier region to be used to transmit the scheduling request within the second radio frequency region 315-b.

Figure 4:
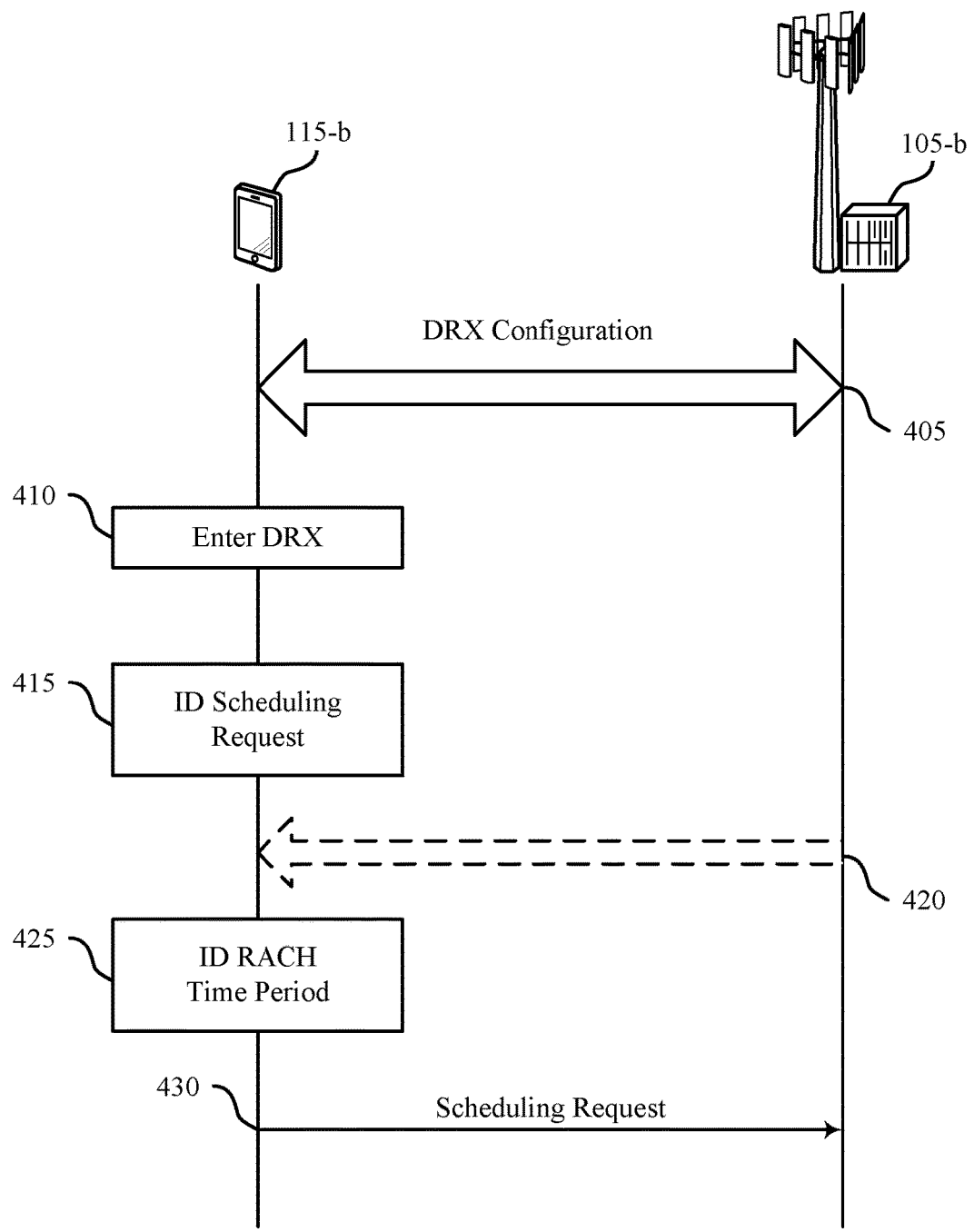
FIG. 4 illustrates an example of a process flow in a system that supports SR collection after a DRX period in accordance with aspects of the present disclosure.

FIG. 4 illustrates an example of a process flow 400 for scheduling request collection after a DRX period in accordance with various aspects of the present disclosure. Process flow 400 may include base station 105-b and UE 115-b, which may be examples of the corresponding devices described with reference to FIGS. 1-2.

At step 405, the base station 105-b may configure the UE 115-b with a DRX configuration. In some cases, configuring the DRX configuration may occur during radio resource control (RRC) connection. The UE 115-b or the base station 105-b may select at least one of a random cyclic shift, a random set of subcarriers, or a random sequence such that a scheduling request may be transmitted using the random cyclic shift, the random set of subcarriers, the random sequence, or combinations thereof. In some cases, the base station 105-b may transmit, and the UE 115-b may receive, an indication of at least one of a cyclic shift, a set of subcarriers, or a sequence index from the base station 105-b, and a scheduling request may be transmitted using the cyclic shift, the set of subcarriers, the sequence index, or combinations thereof.

At step 410, UE 115-b may enter a sleep mode of DRX configuration. During a sleep mode, the UE 115-b may stop monitoring transmissions from the base station 105-b on the PDCCH. The sleep mode of DRX may have a sleep period. The duration of the sleep period may be determined by the base station 105-b or the duration of the sleep period may be requested by the UE 115-b.

At step 415, the UE 115-b may identify a scheduling request to be transmitted to the base station 105-b. For example, UE 115-b may determine that uplink data is available to be transmitted.

At step 420, the base station 105-b may transmit, and the UE 115-b may receive, a synchronization subframe including one or more synchronization signals. In some cases, the synchronization subframe is a directional synchronization subframe. The UE 115-b may also identify the directional synchronization subframe from a set of directional subframes transmitted by the base station 105-b based on a signal strength of the directional synchronization subframe.

At step 425, the UE 115-b may identify a time period (or some other resource) associated with a RACH. In some examples, the time period associated with the RACH is identified based on the directional synchronization subframe received by the UE 115-b at step 420. In some cases, the base station 105-b may identify the time period associated with RACH following a sleep period of the DRX configuration. In some examples a resource (e.g., a time period, a symbol index, a set of subcarriers) associated with the scheduling request is identified based on the directional synchronization subframe received by the UE 115-b at step 420.

At step 430, the UE 115-b may transmit, and the base station 105-b may receive, a scheduling request during the time period associated with the RACH. In some cases, the UE 115-b enters an active mode of the DRX configuration and transmits the scheduling request during the active mode.

The UE 115-b or the base station 105-b may also identify a frequency region associated with the RACH. In such cases, the UE 115-b may transmit, and the base station 105-b may receive, a scheduling request using resources located within the frequency region associated with the RACH. The UE 115-b may determine that a length of the sleep period of the DRX sleep mode is greater than a threshold, and the scheduling request may be transmitted using resources located within the frequency region associated with the RACH based on the determination that the length of the sleep period is greater than the threshold. The UE 115-b may also determine that a length of the sleep period is less than a threshold and may transmit the scheduling request using the resources located within the frequency region associated with scheduling requests based on the determination that the length of the sleep period is less than the threshold.

In certain cases, the UE 115-b may identify a frequency region associated with the RACH and a frequency region associated with scheduling requests that does not overlap with the frequency region associated with the RACH. In such cases, the UE 115-b may transmit the scheduling request using resources located within the frequency region associated with scheduling requests based on the sleep period of the DRX configuration.

Figure 5:
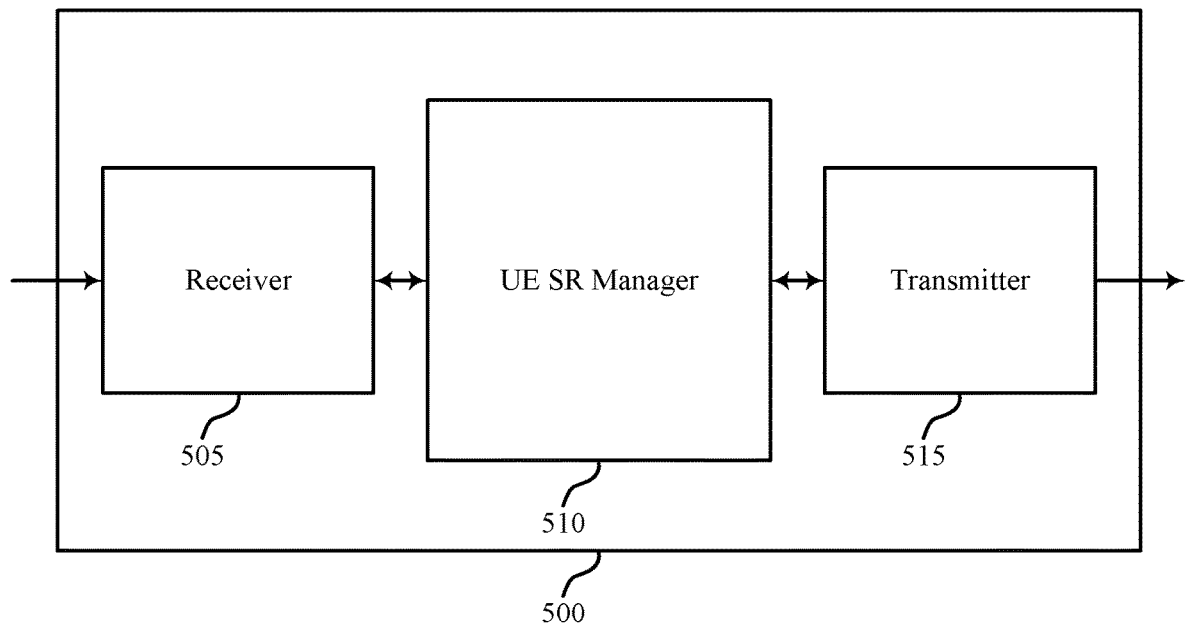
FIGS. 5 through 7 show block diagrams of a wireless device that supports SR collection after a DRX period in accordance with aspects of the present disclosure.

FIG. 5 shows a block diagram of a wireless device 500 that supports SR collection after a DRX period in accordance with various aspects of the present disclosure. Wireless device 500 may be an example of aspects of a UE 115 described with reference to FIGS. 1 and 2. Wireless device 500 may include receiver 505, UE SR manager 510 and transmitter 515. Wireless device 500 may also include a processor. Each of these components may be in communication with each other.

The receiver 505 may receive information such as packets, user data, or control information associated with various information channels (e.g., control channels, data channels, and information related to SR collection after a DRX period, etc.). Information may be passed on to other components of the device. The receiver 505 may be an example of aspects of the transceiver 825 described with reference to FIG. 8.

The UE SR manager 510 may enter a sleep mode of a DRX configuration, identify that a scheduling request is to be transmitted to a base station, identify a time period associated with a RACH, and transmit the scheduling request to the base station during the time period associated with the RACH. The UE SR manager 510 may also be an example of aspects of the UE SR manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
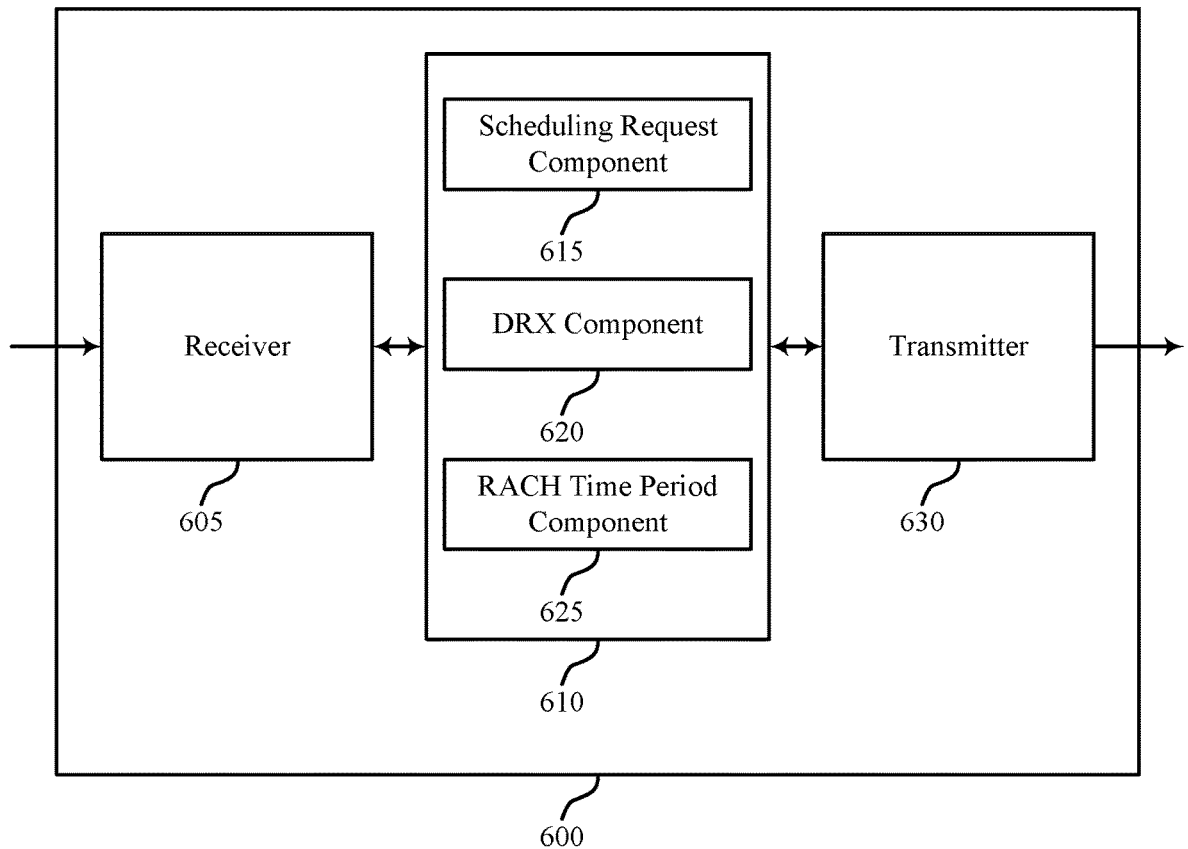

FIG. 6 shows a block diagram of a wireless device 600 that supports SR collection after a DRX period in accordance with various aspects of the present disclosure. Wireless device 600 may be an example of aspects of a wireless device 500 or a UE 115 described with reference to FIGS. 1, 2 and 5. Wireless device 600 may include receiver 605, UE SR manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE SR manager 610 may be an example of aspects of UE SR manager 510 described with reference to FIG. 5. The UE SR manager 610 may include scheduling request component 615, DRX component 620 and RACH time period component 625. The UE SR manager 610 may be an example of aspects of the UE SR manager 805 described with reference to FIG. 8.

The scheduling request component 615 may identify that a scheduling request is to be transmitted to a base station, and transmit the scheduling request to the base station during the time period associated with the RACH.

The DRX component 620 may enter a sleep mode of a DRX configuration. In some cases, the DRX component 620 may enter an active mode of the DRX configuration, where the scheduling request is transmitted during the active mode. The RACH time period component 625 may identify a time period associated with a RACH.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
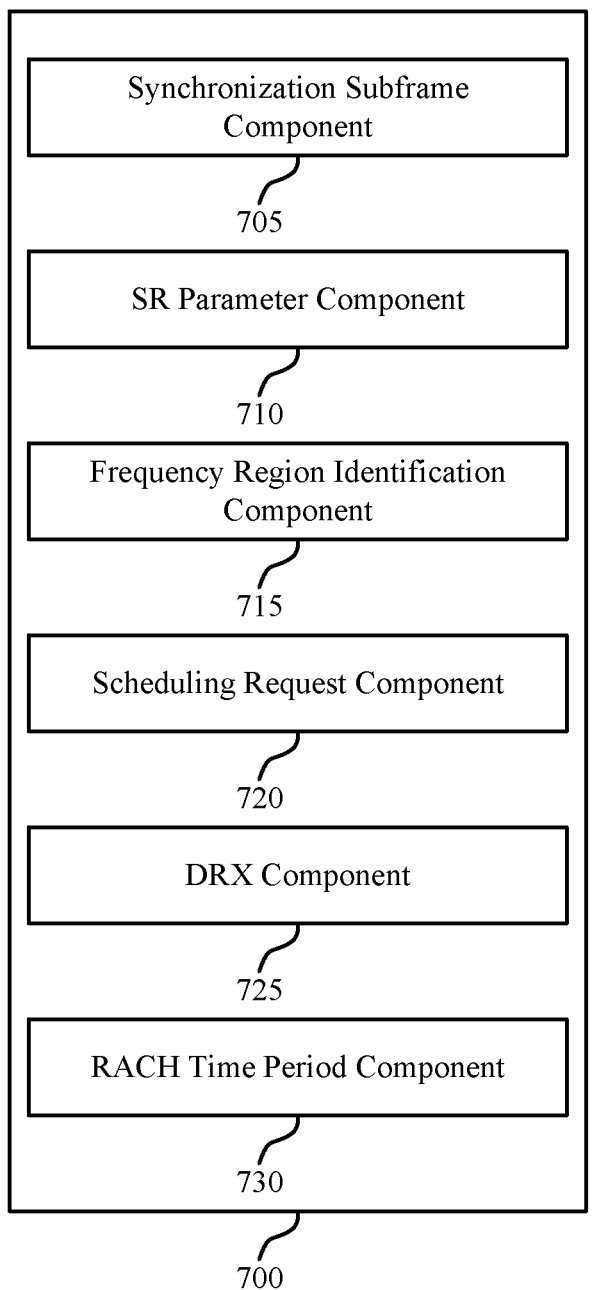

FIG. 7 shows a block diagram of a UE SR manager 700 which may be an example of the corresponding component of wireless device 500 or wireless device 600. That is, UE SR manager 700 may be an example of aspects of UE SR manager 510 or UE SR manager 610 described with reference to FIGS. 5 and 6. The UE SR manager 700 may also be an example of aspects of the UE SR manager 805 described with reference to FIG. 8.

The UE SR manager 700 may include synchronization subframe component 705, SR parameter component 710, frequency region identification component 715, scheduling request component 720, DRX component 725 and RACH time period component 730. Each of these modules may communicate, directly or indirectly, with one another (e.g., via one or more buses).

The synchronization subframe component 705 may receive a directional synchronization subframe from the base station, where a resource associated with the scheduling request is identified based on the received directional synchronization subframe, and identify the directional synchronization subframe from a set of directional subframes transmitted by the base station based on a signal strength of the directional synchronization subframe.

The SR parameter component 710 may select at least one of a random cyclic shift, a random set of subcarriers, or a random sequence, where the scheduling request is transmitted using the random cyclic shift, the random set of subcarriers, the random sequence, or combinations thereof, and receive an indication of at least one of a cyclic shift, a set of subcarriers, or a sequence index from the base station, where the scheduling request is transmitted using the cyclic shift, the set of subcarriers, the sequence index, or combinations thereof.

The frequency region identification component 715 may identify a frequency region associated with the RACH, where the scheduling request is transmitted using resources located within the frequency region associated with the RACH, determine that a length of the sleep period is greater than a threshold, where the scheduling request is transmitted using the resources located within the frequency region associated with the RACH based on the determination that the length of the sleep period is greater than the threshold, or identify a frequency region associated with the RACH and a frequency region associated with scheduling requests that does not overlap with the frequency region associated with the RACH, where the scheduling request is transmitted using resources located within the frequency region associated with scheduling requests based on the sleep period of the DRX configuration, and determine that a length of the sleep period is less than a threshold, where the scheduling request is transmitted using the resources located within the frequency region associated with scheduling requests based on the determination that the length of the sleep period is less than the threshold.

The scheduling request component 720 may identify that a scheduling request is to be transmitted to a base station, and transmit the scheduling request to the base station during the time period associated with the RACH. The DRX component 725 may enter a sleep mode of a DRX configuration, the sleep mode having a sleep period, and enter an active mode of the DRX configuration, where the scheduling request is transmitted during the active mode. The RACH time period component 730 may identify a time period associated with a RACH.

Figure 8:
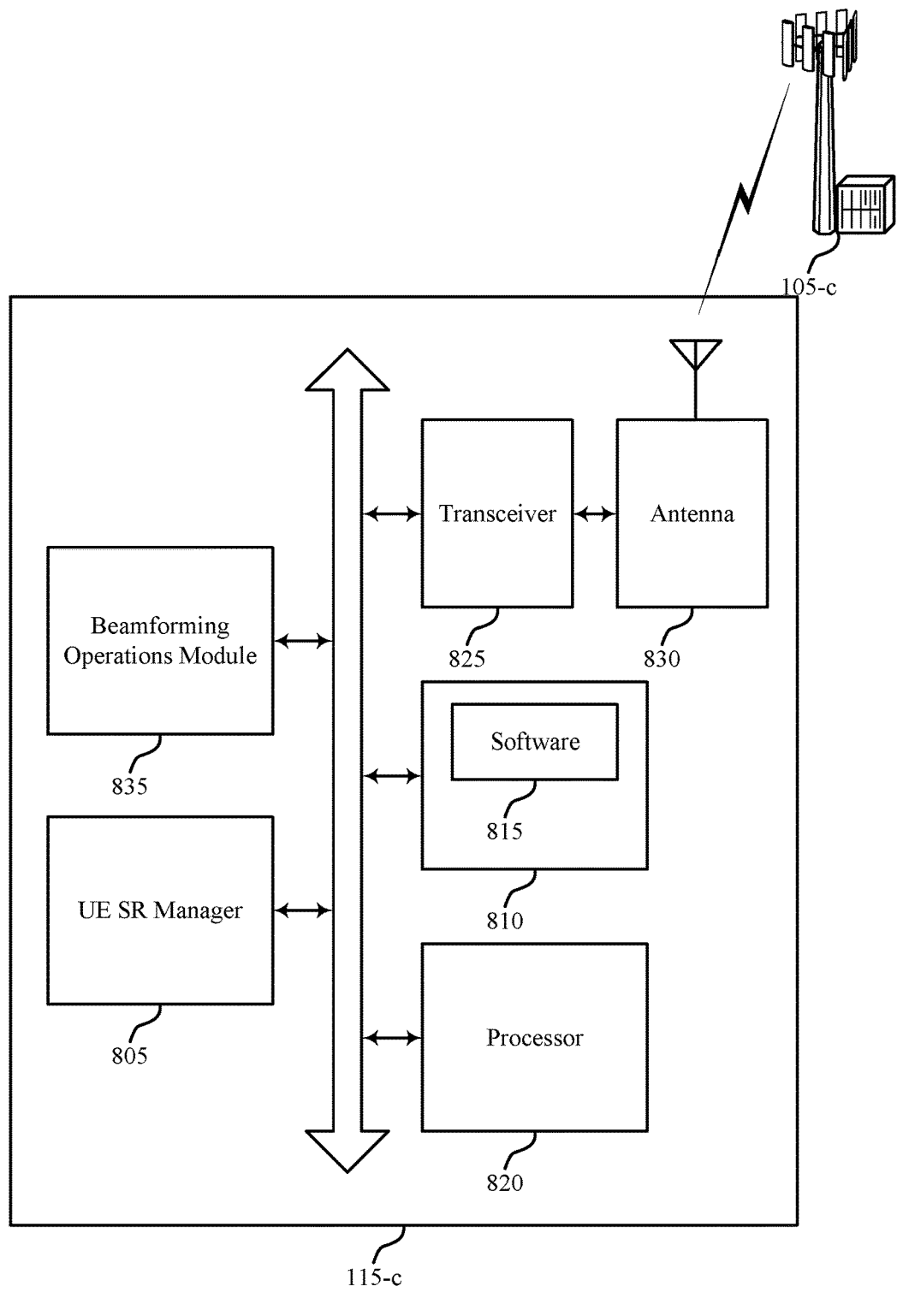
FIG. 8 illustrates a block diagram of a system including a user equipment (UE) that supports SR collection after a DRX period in accordance with aspects of the present disclosure.

FIG. 8 shows a diagram of a system 800 including a device that supports SR collection after a DRX period in accordance with various aspects of the present disclosure. For example, system 800 may include UE 115-c, which may be an example of a wireless device 500, a wireless device 600, or a UE 115 as described with reference to FIGS. 1, 2 and 5 through 7.

UE 115-c may also include UE SR manager 805, memory 810, processor 820, transceiver 825, antenna 830 and beamforming operations module 835. Each of these modules may communicate, directly or indirectly, with one another (e.g., via one or more buses). The UE SR manager 805 may be an example of a UE SR manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., SR collection after a DRX period, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

Beamforming operations module 835 may enable a UE 115-c to send and receive transmissions using beamforming techniques (i.e., directional transmissions using an array of antennas).

Figure 9:
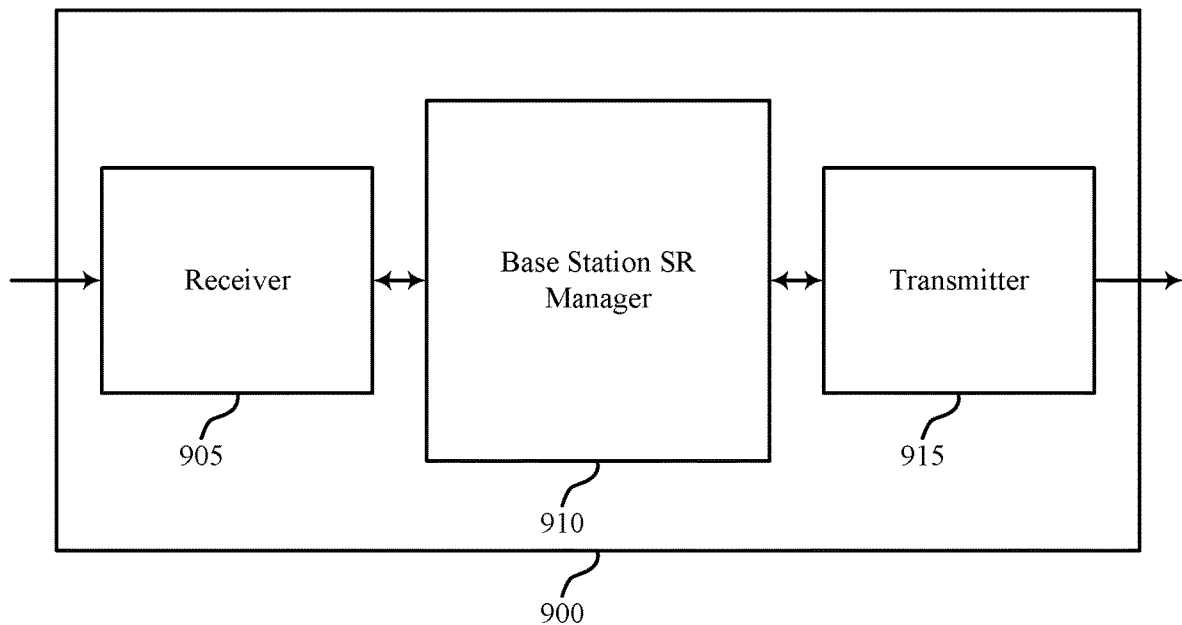
FIGS. 9 through 11 show block diagrams of a wireless device that supports SR collection after a DRX period in accordance with aspects of the present disclosure.

FIG. 9 shows a block diagram of a wireless device 900 that supports SR collection after a DRX period in accordance with various aspects of the present disclosure. Wireless device 900 may be an example of aspects of a base station 105 described with reference to FIGS. 1 and 2. Wireless device 900 may include receiver 905, base station SR manager 910 and transmitter 915. Wireless device 900 may also include a processor. Each of these components may be in communication with each other.

The receiver 905 may receive information such as packets, user data, or control information associated with various information channels (e.g., control channels, data channels, and information related to SR collection after a DRX period, etc.). Information may be passed on to other components of the device. The receiver 905 may be an example of aspects of the transceiver 1225 described with reference to FIG. 12.

The base station SR manager 910 may configure a UE with a DRX configuration, identify a time period associated with a RACH following a sleep period of the DRX configuration, and receive a scheduling request from the UE during the time period associated with the RACH. The base station SR manager 910 may also be an example of aspects of the base station SR manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
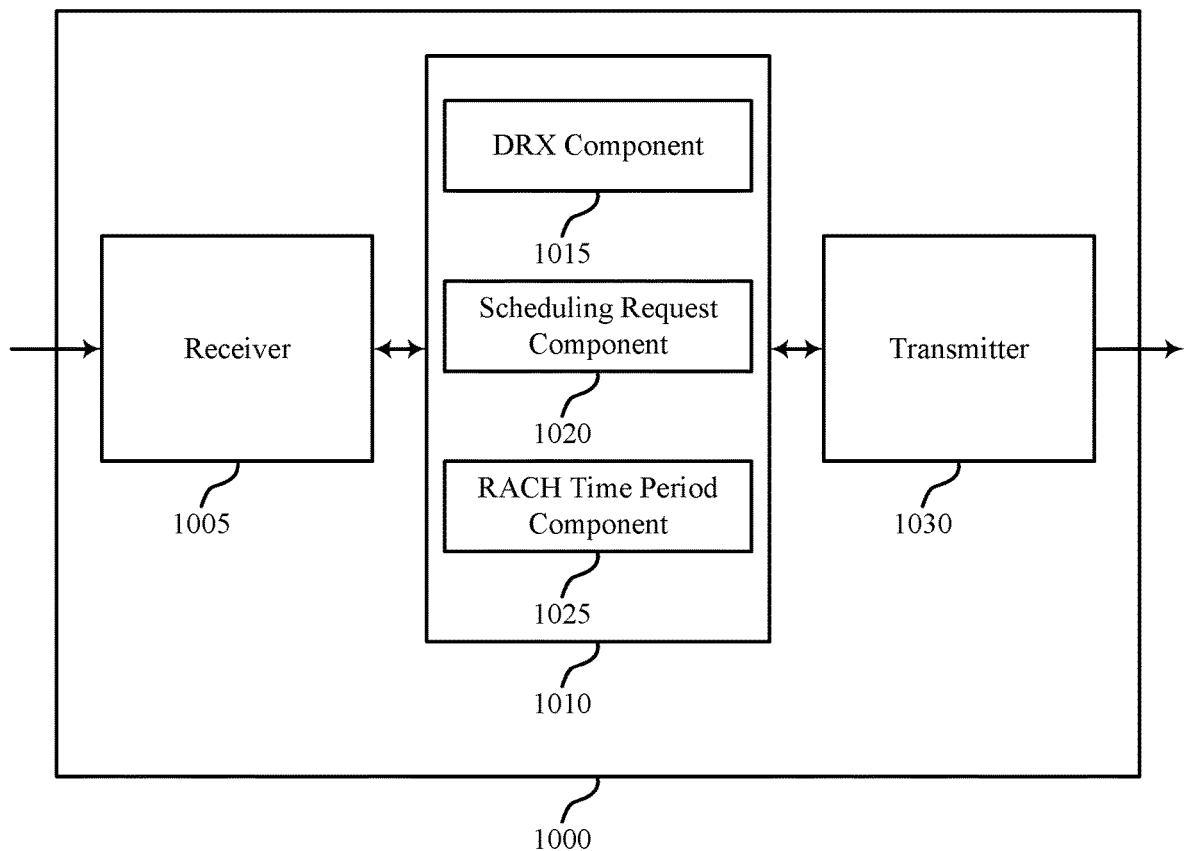

FIG. 10 shows a block diagram of a wireless device 1000 that supports SR collection after a DRX period in accordance with various aspects of the present disclosure. Wireless device 1000 may be an example of aspects of a wireless device 900 or a base station 105 described with reference to FIGS. 1, 2 and 9. Wireless device 1000 may include receiver 1005, base station SR manager 1010 and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station SR manager 1010 may be an example of aspects of base station SR manager 910 described with reference to FIG. 9. The base station SR manager 1010 may include DRX component 1015, scheduling request component 1020 and RACH time period component 1025. The base station SR manager 1010 may be an example of aspects of the base station SR manager 1205 described with reference to FIG. 12.

The DRX component 1015 may configure a UE with a DRX configuration. The scheduling request component 1020 may receive a scheduling request from the UE during the time period associated with the RACH. The RACH time period component 1025 may identify a time period associated with a RACH following a sleep period of the DRX configuration.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or it may utilize a plurality of antennas.

Figure 11:
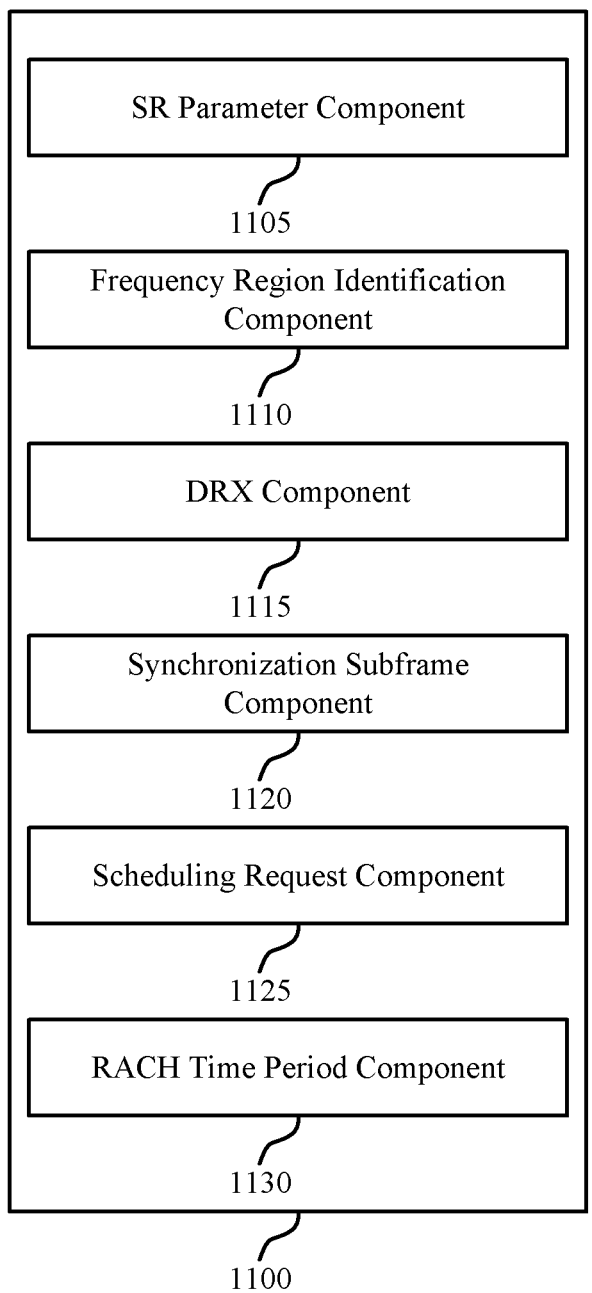

FIG. 11 shows a block diagram of a base station SR manager 1100 which may be an example of the corresponding component of wireless device 900 or wireless device 1000. That is, base station SR manager 1100 may be an example of aspects of base station SR manager 910 or base station SR manager 1010 described with reference to FIGS. 9 and 10. The base station SR manager 1100 may also be an example of aspects of the base station SR manager 1205 described with reference to FIG. 12.

The base station SR manager 1100 may include SR parameter component 1105, frequency region identification component 1110, DRX component 1115, synchronization subframe component 1120, scheduling request component 1125 and RACH time period component 1130. Each of these modules may communicate, directly or indirectly, with one another (e.g., via one or more buses).

The SR parameter component 1105 may transmit an indication of at least one of a cyclic shift, a set of subcarriers, or a sequence index to the UE, where the scheduling request is received using the cyclic shift, the set of subcarriers, the sequence index, or combinations thereof.

The frequency region identification component 1110 may identify a frequency region associated with the RACH, where the scheduling request is received using resources located within the frequency region associated with the RACH, or identify a frequency region associated with the RACH and a frequency region associated with scheduling requests that does not overlap with the frequency region associated with the RACH, where the scheduling request is transmitted using resources located within the frequency region associated with scheduling requests based on the sleep period of the DRX configuration.

The DRX component 1115 may configure a UE with a DRX configuration. The synchronization subframe component 1120 may transmit a directional synchronization subframe to the UE, where a resource associated with the scheduling request is associated with the received directional synchronization subframe.

The scheduling request component 1125 may receive a scheduling request from the UE during the time period associated with the RACH. The RACH time period component 1130 may identify a time period associated with a RACH following a sleep period of the DRX configuration.

Figure 12:
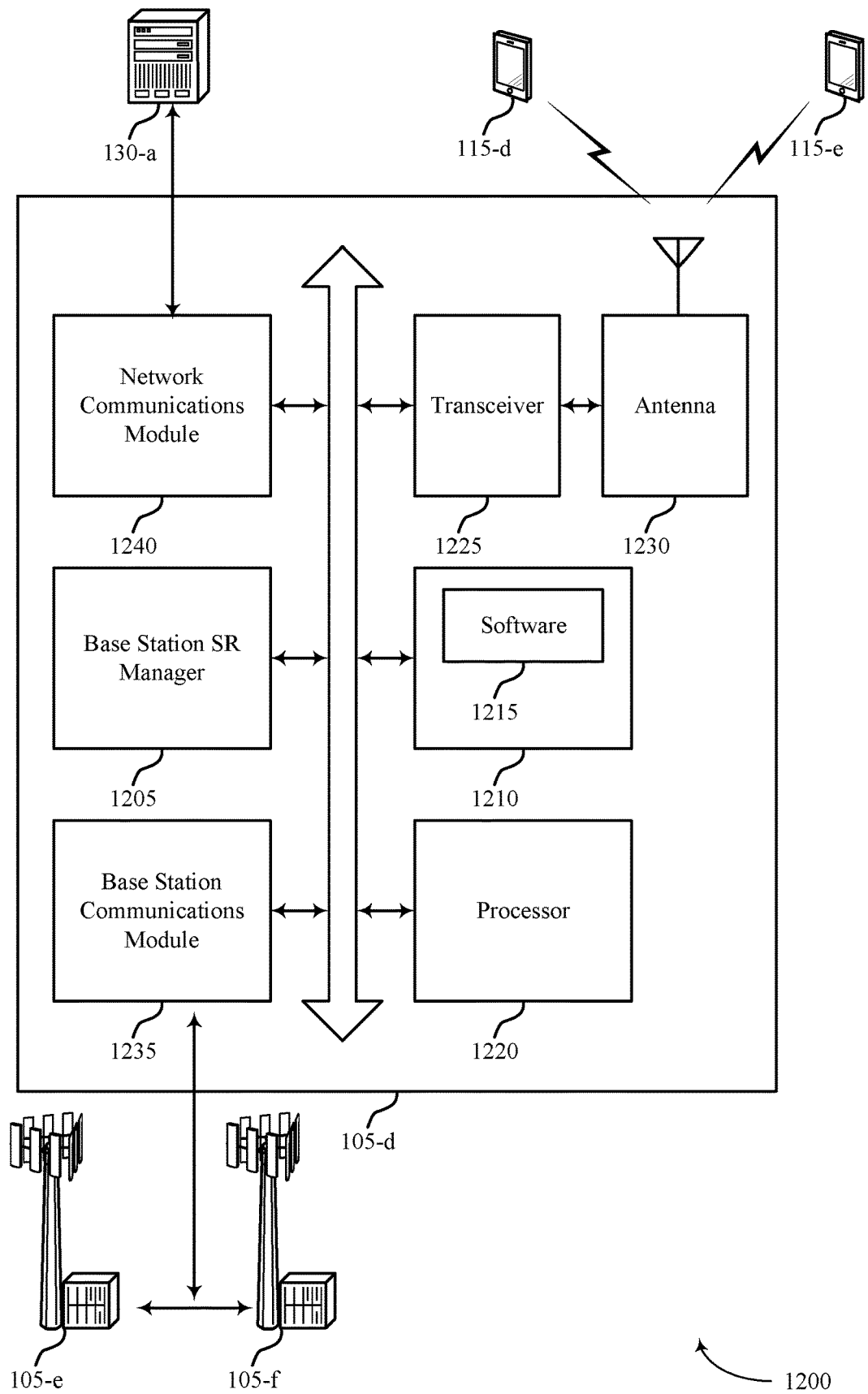
FIG. 12 illustrates a block diagram of a system including a base station that supports SR collection after a DRX period in accordance with aspects of the present disclosure.

FIG. 12 shows a diagram of a wireless system 1200 including a device configured that supports SR collection after a DRX period in accordance with various aspects of the present disclosure. For example, wireless system 1200 may include base station 105-*d*, which may be an example of a wireless device 900, a wireless device 1000, or a base station 105 as described with reference to FIGS. 1, 2 and 9 through 11. Base station 105-*d* may also include components for bi-directional voice and data communications including components for transmitting communications and components for receiving communications. For example, base station 105-*d* may communicate bi-directionally with one or more UEs 115.

Base station 105-*d* may also include base station SR manager 1205, memory 1210, processor 1220, transceiver 1225, antenna 1230, base station communications module 1235 and network communications module 1240. Each of these modules may communicate, directly or indirectly, with one another (e.g., via one or more buses). The base station SR manager 1205 may be an example of a base station SR manager as described with reference to FIGS. 9 through 11.

The memory 1210 may include RAM and ROM. The memory 1210 may store computer-readable, computer-executable software including instructions that, when executed, cause the processor to perform various functions described herein (e.g., SR collection after a DRX period, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base stations 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
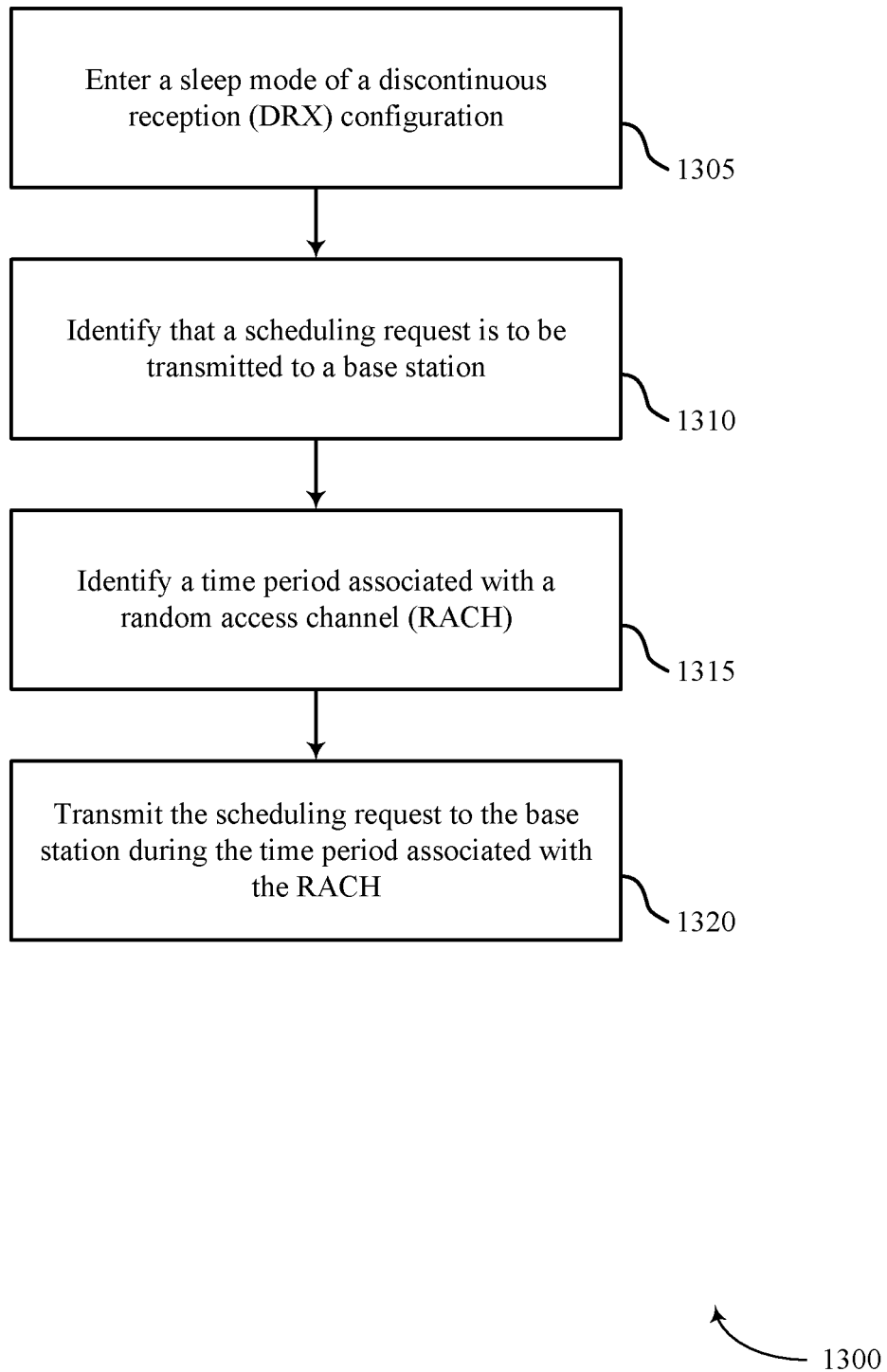
FIGS. 13 through 21 illustrate methods for SR collection after a DRX period in accordance with aspects of the present disclosure.

FIG. 13 shows a flowchart illustrating a method 1300 for SR collection after a DRX period in accordance with various aspects of the present disclosure. The operations of method 1300 may be implemented by a device such as a UE 115 or its components as described with reference to FIGS. 1 and 2. For example, the operations of method 1300 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may enter a sleep mode of a DRX configuration as described above with reference to FIGS. 2 through 4. In certain examples, the operations of block 1305 may be performed by the DRX component as described with reference to FIGS. 6 and 7.

At block 1310, the UE 115 may identify that a scheduling request is to be transmitted to a base station as described above with reference to FIGS. 2 through 4. In certain examples, the operations of block 1310 may be performed by the scheduling request component as described with reference to FIGS. 6 and 7.

At block 1315, the UE 115 may identify a time period associated with a RACH as described above with reference to FIGS. 2 through 4. In certain examples, the operations of block 1315 may be performed by the RACH time period component as described with reference to FIGS. 6 and 7.

At block 1320, the UE 115 may transmit the scheduling request to the base station during the time period associated with the RACH as described above with reference to FIGS. 2 through 4. In certain examples, the operations of block 1320 may be performed by the scheduling request component as described with reference to FIGS. 6 and 7.

Figure 14:
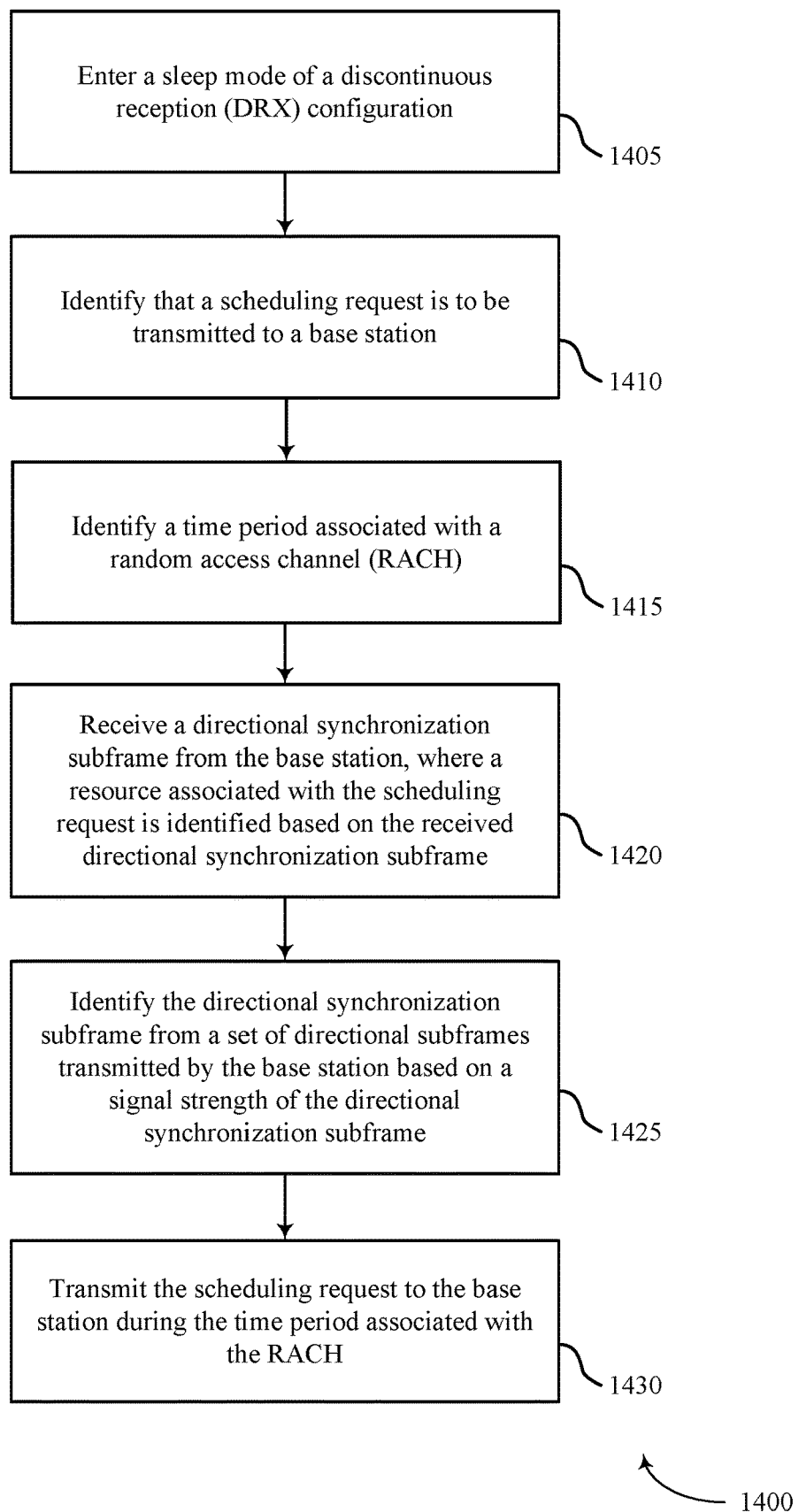

FIG. 14 shows a flowchart illustrating a method 1400 for SR collection after a DRX period in accordance with various aspects of the present disclosure. The operations of method 1400 may be implemented by a device such as a UE 115 or its components as described with reference to FIGS. 1 and 2. For example, the operations of method 1400 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may enter a sleep mode of a DRX configuration as described above with reference to FIGS. 2 through 4. In certain examples, the operations of block 1405 may be performed by the DRX component as described with reference to FIGS. 6 and 7.

At block 1410, the UE 115 may identify that a scheduling request is to be transmitted to a base station as described above with reference to FIGS. 2 through 4. In certain examples, the operations of block 1410 may be performed by the scheduling request component as described with reference to FIGS. 6 and 7.

At block 1415, the UE 115 may identify a time period associated with a RACH as described above with reference to FIGS. 2 through 4. In certain examples, the operations of block 1425 may be performed by the RACH time period component as described with reference to FIGS. 6 and 7.

At block 1420, the UE 115 may receive a directional synchronization subframe from the base station, where a resource associated with the scheduling request is identified based on the received directional synchronization subframe as described above with reference to FIGS. 2 through 4. In certain examples, the operations of block 1415 may be performed by the synchronization subframe component as described with reference to FIGS. 6 and 7.

At block 1425, the UE 115 may identify the directional synchronization subframe from a set of directional subframes transmitted by the base station based on a signal strength of the directional synchronization subframe as described above with reference to FIGS. 2 through 4. In certain examples, the operations of block 1420 may be performed by the synchronization subframe component as described with reference to FIGS. 6 and 7.

At block 1430, the UE 115 may transmit the scheduling request to the base station during the time period associated with the RACH as described above with reference to FIGS. 2 through 4. In certain examples, the operations of block 1430 may be performed by the scheduling request component as described with reference to FIGS. 6 and 7.

Figure 15:
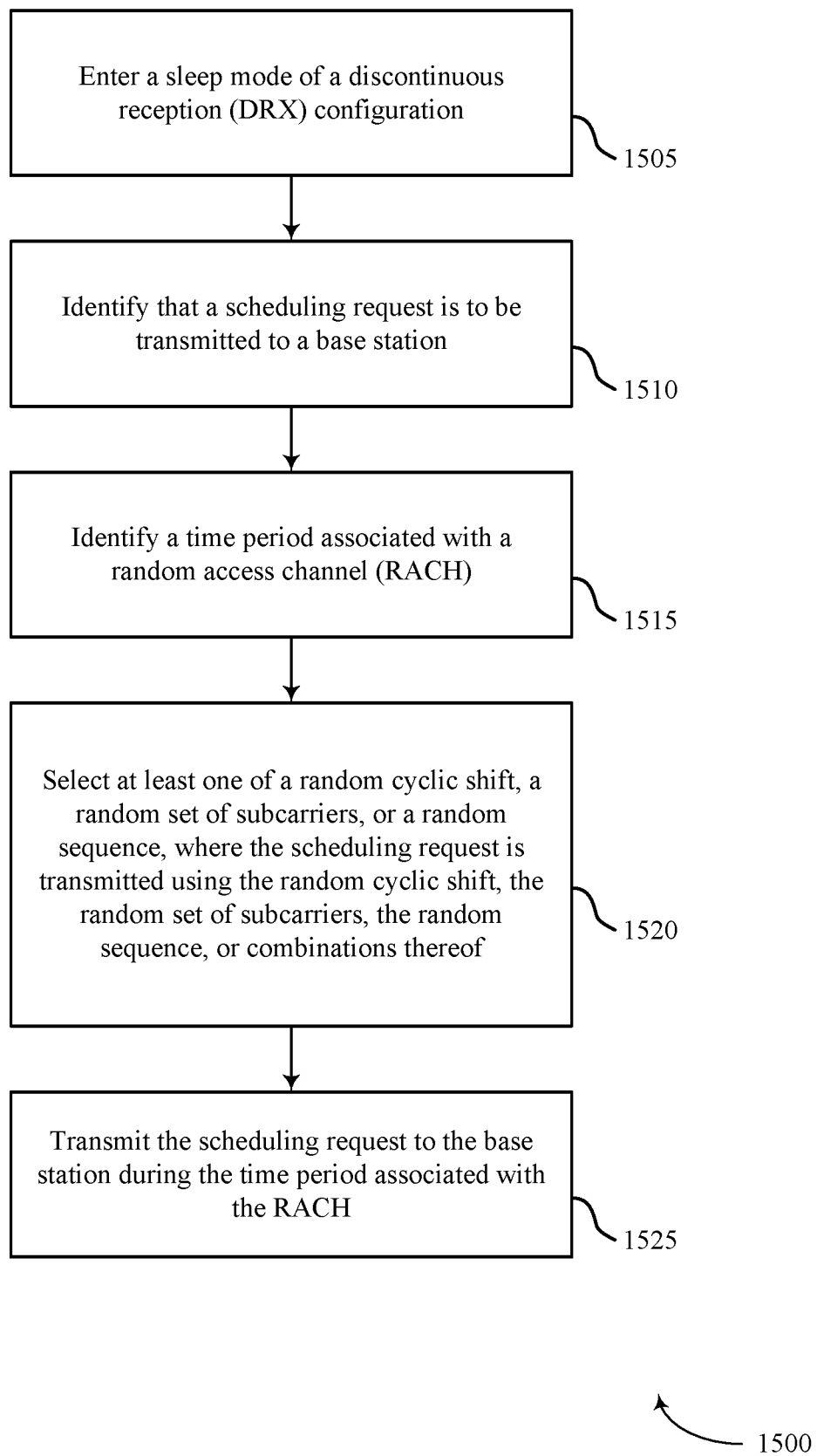

FIG. 15 shows a flowchart illustrating a method 1500 for SR collection after a DRX period in accordance with various aspects of the present disclosure. The operations of method 1500 may be implemented by a device such as a UE 115 or its components as described with reference to FIGS. 1 and 2. For example, the operations of method 1500 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may enter a sleep mode of a DRX configuration as described above with reference to FIGS. 2 through 4. In certain examples, the operations of block 1505 may be performed by the DRX component as described with reference to FIGS. 6 and 7.

At block 1510, the UE 115 may identify that a scheduling request is to be transmitted to a base station as described above with reference to FIGS. 2 through 4. In certain examples, the operations of block 1510 may be performed by the scheduling request component as described with reference to FIGS. 6 and 7.

At block 1515, the UE 115 may identify a time period associated with a RACH as described above with reference to FIGS. 2 through 4. In certain examples, the operations of block 1515 may be performed by the RACH time period component as described with reference to FIGS. 6 and 7.

At block 1520, the UE 115 may select at least one of a random cyclic shift, a random set of subcarriers, or a random sequence, where the scheduling request is transmitted using the random cyclic shift, the random set of subcarriers, the random sequence, or combinations thereof as described above with reference to FIGS. 2 through 4. In certain examples, the operations of block 1520 may be performed by the SR parameter component as described with reference to FIGS. 6 and 7.

At block 1525, the UE 115 may transmit the scheduling request to the base station during the time period associated with the RACH as described above with reference to FIGS. 2 through 4. In certain examples, the operations of block 1525 may be performed by the scheduling request component as described with reference to FIGS. 6 and 7.

Figure 16:
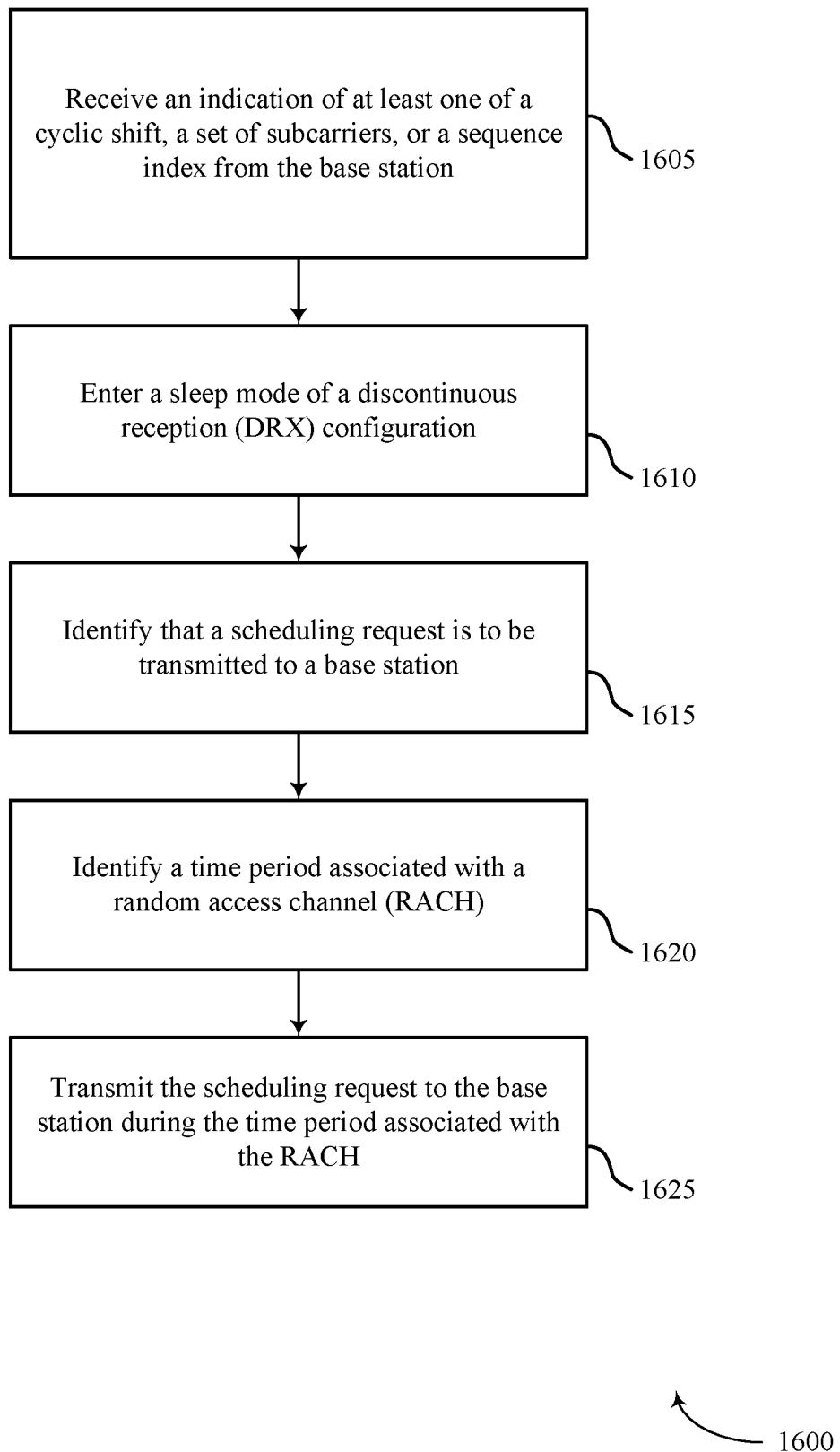

FIG. 16 shows a flowchart illustrating a method 1600 for SR collection after a DRX period in accordance with various aspects of the present disclosure. The operations of method 1600 may be implemented by a device such as a UE 115 or its components as described with reference to FIGS. 1 and 2. For example, the operations of method 1600 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive an indication of at least one of a cyclic shift, a set of subcarriers, or a sequence index from the base station, where the scheduling request is transmitted using the cyclic shift, the set of subcarriers, the sequence index, or combinations thereof as described above with reference to FIGS. 2 through 4. In certain examples, the operations of block 1605 may be performed by the SR parameter component as described with reference to FIGS. 6 and 7.

At block 1610, the UE 115 may enter a sleep mode of a DRX configuration, the sleep mode having a sleep period as described above with reference to FIGS. 2 through 4. In certain examples, the operations of block 1610 may be performed by the DRX component as described with reference to FIGS. 6 and 7.

At block 1615, the UE 115 may identify that a scheduling request is to be transmitted to a base station as described above with reference to FIGS. 2 through 4. In certain examples, the operations of block 1615 may be performed by the scheduling request component as described with reference to FIGS. 6 and 7.

At block 1620, the UE 115 may identify a time period associated with a RACH as described above with reference to FIGS. 2 through 4. In certain examples, the operations of block 1620 may be performed by the RACH time period component as described with reference to FIGS. 6 and 7.

At block 1625, the UE 115 may transmit the scheduling request to the base station during the time period associated with the RACH as described above with reference to FIGS. 2 through 4. In certain examples, the operations of block 1625 may be performed by the scheduling request component as described with reference to FIGS. 6 and 7.

Figure 17:
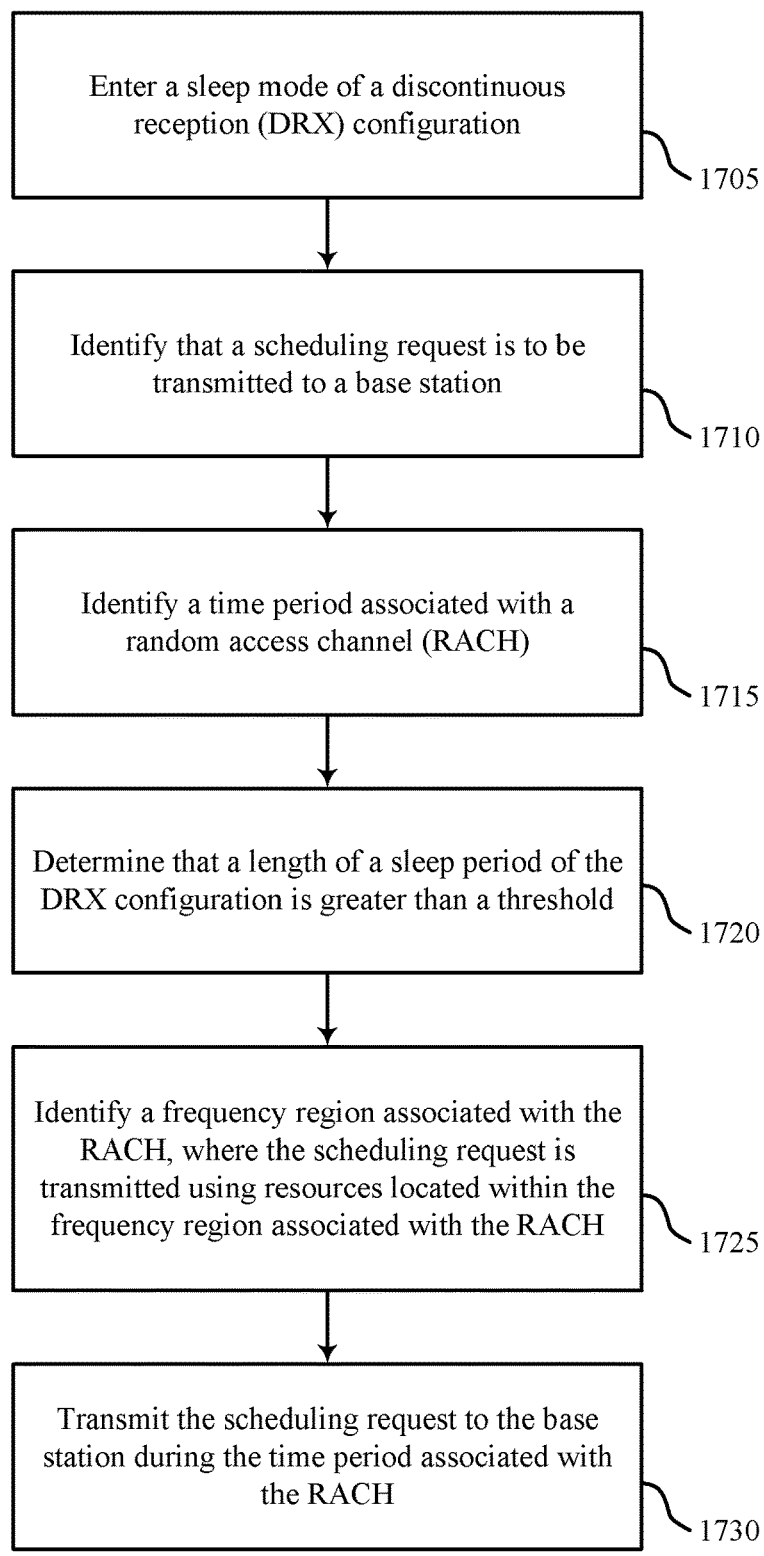

FIG. 17 shows a flowchart illustrating a method 1700 for SR collection after a DRX period in accordance with various aspects of the present disclosure. The operations of method 1700 may be implemented by a device such as a UE 115 or its components as described with reference to FIGS. 1 and 2. For example, the operations of method 1700 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may enter a sleep mode of a DRX configuration as described above with reference to FIGS. 2 through 4. In certain examples, the operations of block 1705 may be performed by the DRX component as described with reference to FIGS. 6 and 7.

At block 1710, the UE 115 may identify that a scheduling request is to be transmitted to a base station as described above with reference to FIGS. 2 through 4. In certain examples, the operations of block 1710 may be performed by the scheduling request component as described with reference to FIGS. 6 and 7.

At block 1715, the UE 115 may identify a time period associated with a RACH as described above with reference to FIGS. 2 through 4. In certain examples, the operations of block 1715 may be performed by the RACH time period component as described with reference to FIGS. 6 and 7.

At block 1720, the UE 115 may determine that a length of a sleep period of the DRX configuration is greater than a threshold, where the scheduling request is transmitted using the resources located within the frequency region associated with the RACH based on the determination that the length of the sleep period is greater than the threshold as described above with reference to FIGS. 2 through 4. In certain examples, the operations of block 1720 may be performed by the frequency region identification component as described with reference to FIGS. 6 and 7.

At block 1725, the UE 115 may identify a frequency region associated with the RACH, where the scheduling request is transmitted using resources located within the frequency region associated with the RACH as described above with reference to FIGS. 2 through 4. In certain examples, the operations of block 1725 may be performed by the frequency region identification component as described with reference to FIGS. 6 and 7.

At block 1730, the UE 115 may transmit the scheduling request to the base station during the time period associated with the RACH as described above with reference to FIGS. 2 through 4. In certain examples, the operations of block 1730 may be performed by the scheduling request component as described with reference to FIGS. 6 and 7.

Figure 18:
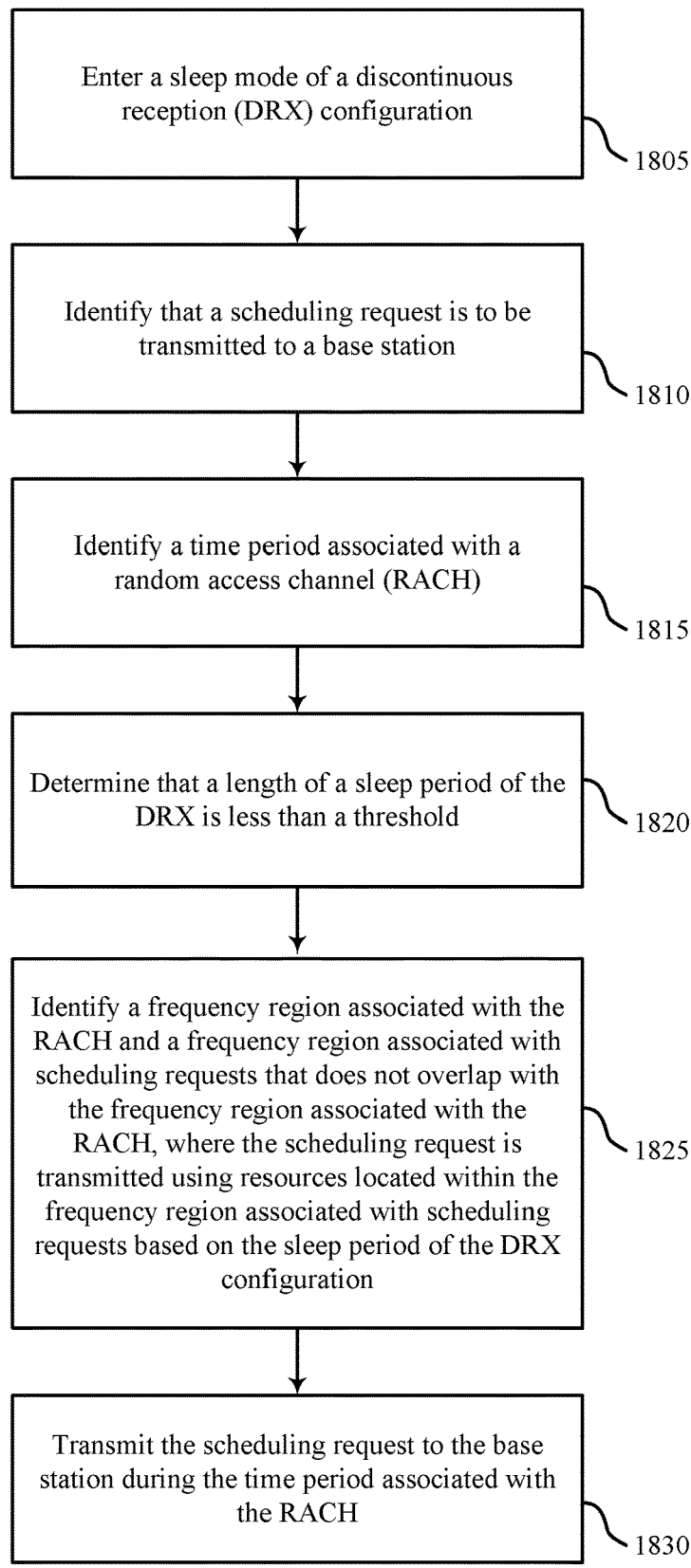

FIG. 18 shows a flowchart illustrating a method 1800 for SR collection after a DRX period in accordance with various aspects of the present disclosure. The operations of method 1800 may be implemented by a device such as a UE 115 or its components as described with reference to FIGS. 1 and 2. For example, the operations of method 1800 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may enter a sleep mode of a DRX configuration as described above with reference to FIGS. 2 through 4. In certain examples, the operations of block 1805 may be performed by the DRX component as described with reference to FIGS. 6 and 7.

At block 1810, the UE 115 may identify that a scheduling request is to be transmitted to a base station as described above with reference to FIGS. 2 through 4. In certain examples, the operations of block 1810 may be performed by the scheduling request component as described with reference to FIGS. 6 and 7.

At block 1815, the UE 115 may identify a time period associated with a RACH as described above with reference to FIGS. 2 through 4. In certain examples, the operations of block 1815 may be performed by the RACH time period component as described with reference to FIGS. 6 and 7.

At block 1820, the UE 115 may determine that a length of a sleep period of the DRX configuration is less than a threshold, where the scheduling request is transmitted using the resources located within the frequency region associated with scheduling requests based on the determination that the length of the sleep period is less than the threshold as described above with reference to FIGS. 2 through 4. In certain examples, the operations of block 1820 may be performed by the frequency region identification component as described with reference to FIGS. 6 and 7.

At block 1825, the UE 115 may identify a frequency region associated with the RACH and a frequency region associated with scheduling requests that does not overlap with the frequency region associated with the RACH, where the scheduling request is transmitted using resources located within the frequency region associated with scheduling requests based on the sleep period of the DRX configuration as described above with reference to FIGS. 2 through 4. In certain examples, the operations of block 1825 may be performed by the frequency region identification component as described with reference to FIGS. 6 and 7.

At block 1830, the UE 115 may transmit the scheduling request to the base station during the time period associated with the RACH as described above with reference to FIGS. 2 through 4. In certain examples, the operations of block 1830 may be performed by the scheduling request component as described with reference to FIGS. 6 and 7.

Figure 19:
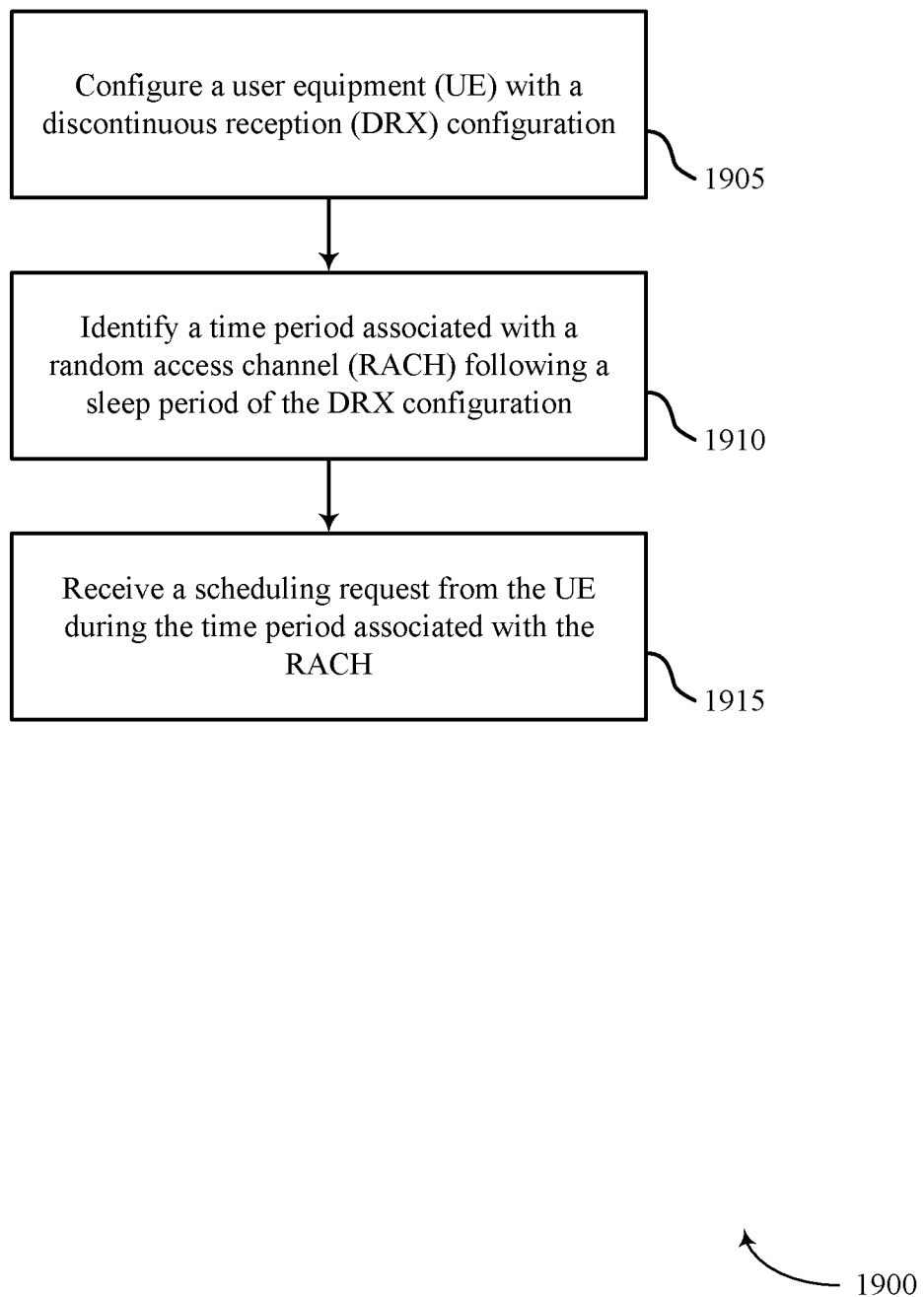

FIG. 19 shows a flowchart illustrating a method 1900 for SR collection after a DRX period in accordance with various aspects of the present disclosure. The operations of method 1900 may be implemented by a device such as a base station 105 or its components as described with reference to FIGS. 1 and 2. For example, the operations of method 1900 may be performed by the base station SR manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may configure a UE with a DRX configuration as described above with reference to FIGS. 2 through 4. In certain examples, the operations of block 1905 may be performed by the DRX component as described with reference to FIGS. 10 and 11.

At block 1910, the base station 105 may identify a time period associated with a RACH following a sleep period of the DRX configuration as described above with reference to FIGS. 2 through 4. In certain examples, the operations of block 1910 may be performed by the RACH time period component as described with reference to FIGS. 10 and 11.

At block 1915, the base station 105 may receive a scheduling request from the UE during the time period associated with the RACH as described above with reference to FIGS. 2 through 4. In certain examples, the operations of block 1915 may be performed by the scheduling request component as described with reference to FIGS. 10 and 11.

Figure 20:
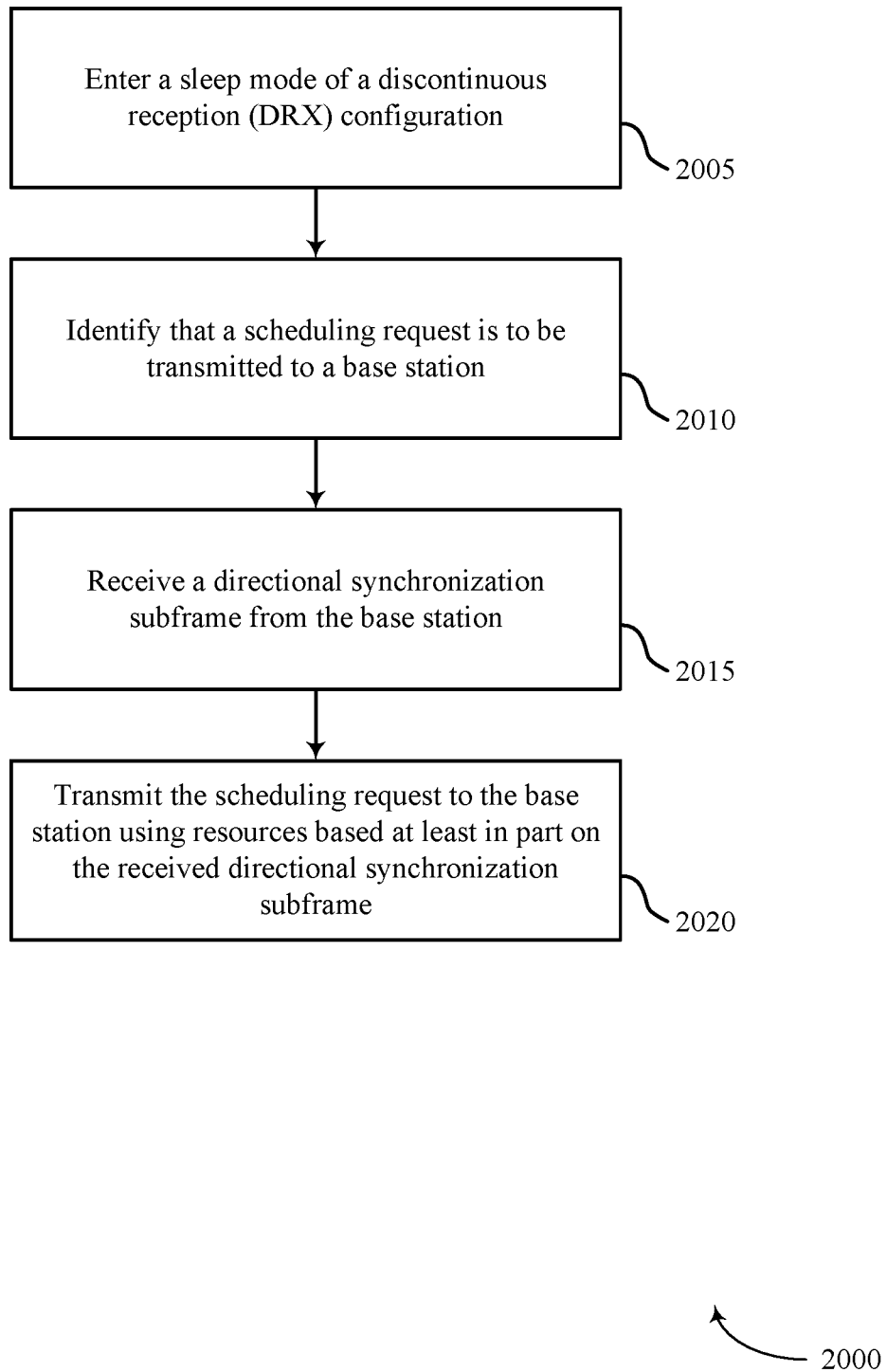

FIG. 20 shows a flowchart illustrating a method 2000 for SR collection after a DRX period in accordance with various aspects of the present disclosure. The operations of method 2000 may be implemented by a device such as a UE 115 or its components as described with reference to FIGS. 1 and 2. For example, the operations of method 2000 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 2005, the UE 115 may enter a sleep mode of a DRX configuration as described above with reference to FIGS. 2 through 4. In certain examples, the operations of block 2005 may be performed by the DRX component as described with reference to FIGS. 6 and 7.

At block 2010, the UE 115 may identify that a scheduling request is to be transmitted to a base station as described above with reference to FIGS. 2 through 4. In certain examples, the operations of block 2010 may be performed by the scheduling request component as described with reference to FIGS. 6 and 7.

At block 2015, the UE 115 may receive a directional synchronization subframe from the base station as described above with reference to FIGS. 2 through 4. In certain examples, the operations of block 2015 may be performed by the synchronization subframe component as described with reference to FIGS. 6 and 7.

At block 2020, the UE 115 may transmit the scheduling request to the base station using resources based at least in part on the received directional synchronization subframe as described above with reference to FIGS. 2 through 4. In certain examples, the operations of block 2020 may be performed by the scheduling request component as described with reference to FIGS. 6 and 7.

Figure 21:
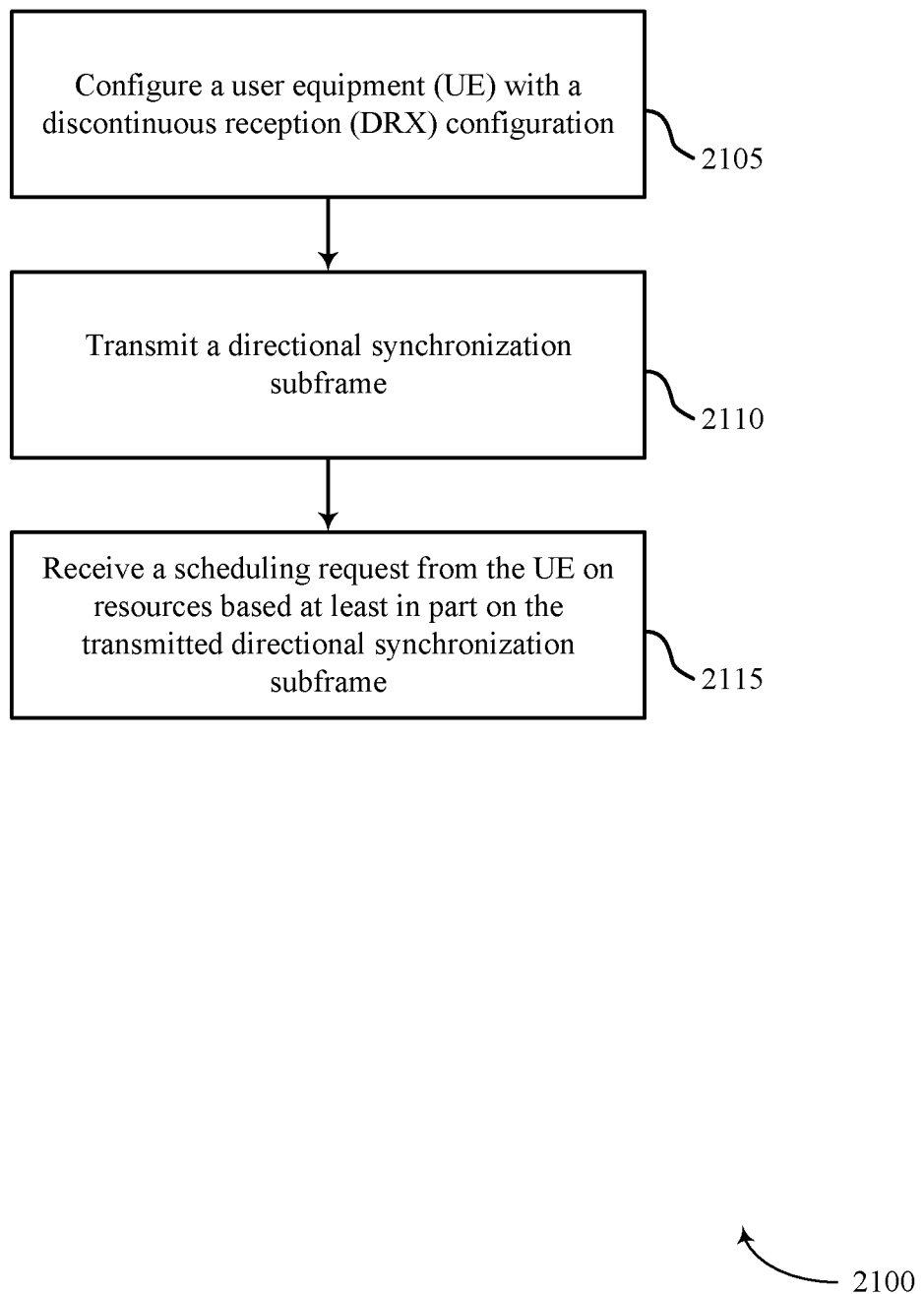

FIG. 21 shows a flowchart illustrating a method 2100 for SR collection after a DRX period in accordance with various aspects of the present disclosure. The operations of method 2100 may be implemented by a device such as a base station 105 or its components as described with reference to FIGS. 1 and 2. For example, the operations of method 2100 may be performed by the base station SR manager as described herein. In some examples, the base station 105 may execute a set of codes to control the functional elements of the device to perform the functions described below. Additionally or alternatively, the base station 105 may perform aspects the functions described below using special-purpose hardware.

At block 2105, the base station 105 may configure a UE with a DRX configuration as described above with reference to FIGS. 2 through 4. In certain examples, the operations of block 2105 may be performed by the DRX component as described with reference to FIGS. 10 and 11.

At block 2110, the base station 105 may transmit a directional synchronization subframe as described above with reference to FIGS. 2 through 4. In certain examples, the operations of block 2110 may be performed by the DRX component as described with reference to FIGS. 10 and 11.

At block 2115, the base station 105 may receive a scheduling request from the UE on resources based at least in part on the transmitted directional synchronization subframe as described above with reference to FIGS. 2 through 4. In certain examples, the operations of block 2115 may be performed by the scheduling request component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for SR collection after a DRX period.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrased "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for SR collection after a DRX period. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
entering a sleep mode of a discontinuous reception (DRX) configuration;
identifying that a scheduling request is to be transmitted to a base station;
identifying a time period associated with a random access channel (RACH); and
transmitting the scheduling request to the base station during the time period associated with the RACH.

2. The method of claim 1, further comprising:
entering an active mode of the DRX configuration, wherein the scheduling request is transmitted during the active mode.

3. The method of claim 1, further comprising:
receiving a directional synchronization subframe from the base station, wherein a resource associated with the scheduling request is identified based at least in part on the received directional synchronization subframe.

4. The method of claim 3, wherein the resource associated with the scheduling request comprises a symbol index, a set of subcarriers, or a combination thereof.

5. The method of claim 3, further comprising:
identifying the directional synchronization subframe from a set of directional subframes transmitted by the base station based at least in part on a signal strength of the directional synchronization subframe.

6. The method of claim 1, further comprising:
receiving a directional synchronization subframe from the base station, wherein a resource associated with the RACH is identified based at least in part on the received directional synchronization subframe.

7. The method of claim 1, further comprising:
selecting at least one of a random cyclic shift, a random set of subcarriers, or a random sequence, wherein the scheduling request is transmitted using the random cyclic shift, the random set of subcarriers, the random sequence, or combinations thereof.

8. The method of claim 1, further comprising:
receiving an indication of at least one of a cyclic shift, a set of subcarriers, or a sequence index from the base station, wherein the scheduling request is transmitted using the cyclic shift, the set of subcarriers, the sequence index, or combinations thereof.

9. The method of claim 1, further comprising:
identifying a frequency region associated with the RACH, wherein the scheduling request is transmitted using resources located within the frequency region associated with the RACH.

10. The method of claim 9, further comprising:
determining that a length of a sleep period of the DRX configuration is greater than a threshold, wherein the scheduling request is transmitted using the resources located within the frequency region associated with the RACH based at least in part on the determination that the length of the sleep period is greater than the threshold.

11. The method of claim 1, further comprising:
identifying a frequency region associated with the RACH and a frequency region associated with scheduling requests that does not overlap with the frequency region associated with the RACH, wherein the scheduling request is transmitted using resources located within the frequency region associated with scheduling requests based at least in part on a sleep period of the DRX configuration.

12. The method of claim 11, further comprising:
determining that a length of the sleep period is less than a threshold, wherein the scheduling request is transmitted using the resources located within the frequency region associated with scheduling requests based at least in part on the determination that the length of the sleep period is less than the threshold.

13. A method of wireless communication comprising:
configuring a user equipment (UE) with a discontinuous reception (DRX) configuration;
identifying a time period associated with a random access channel (RACH) following a sleep period of the DRX configuration; and
receiving a scheduling request from the UE during the time period associated with the RACH.

14. The method of claim 13, further comprising:
transmitting a directional synchronization subframe to the UE, wherein a resource associated with the scheduling request is associated with the received directional synchronization subframe.

15. The method of claim 13, further comprising:
transmitting an indication of at least one of a cyclic shift, a set of subcarriers, or a sequence index to the UE, wherein the scheduling request is received using the cyclic shift, the set of subcarriers, the sequence index, or combinations thereof.

16. The method of claim 13, further comprising:
identifying a frequency region associated with the RACH, wherein the scheduling request is received using resources located within the frequency region associated with the RACH.

17. The method of claim 13, further comprising:
identifying a frequency region associated with the RACH and a frequency region associated with scheduling requests that does not overlap with the frequency region associated with the RACH, wherein the scheduling request is transmitted using resources located within the frequency region associated with scheduling requests based at least in part on the sleep period of the DRX configuration.

18. An apparatus for wireless communication comprising:
means for entering a sleep mode of a discontinuous reception (DRX) configuration;
means for identifying that a scheduling request is to be transmitted to a base station;
means for identifying a time period associated with a random access channel (RACH); and
means for transmitting the scheduling request to the base station during the time period associated with the RACH.

19. The apparatus of claim 18, further comprising:
means for entering an active mode of the DRX configuration, wherein the scheduling request is transmitted during the active mode.

20. The apparatus of claim 18, further comprising:
means for receiving a directional synchronization subframe from the base station, wherein a resource associated with the scheduling request is identified based at least in part on the received directional synchronization subframe.

21. The apparatus of claim 20, wherein the resource associated with the scheduling request comprises a symbol index, a set of subcarriers, or a combination thereof.

22. The apparatus of claim 20, further comprising:
means for identifying the directional synchronization subframe from a set of directional subframes transmitted by the base station based at least in part on a signal strength of the directional synchronization subframe.

23. The apparatus of claim 18, further comprising:
means for receiving a directional synchronization subframe from the base station, wherein a resource associated with the RACH is identified based at least in part on the received directional synchronization subframe.

24. The apparatus of claim 18, further comprising:
means for selecting at least one of a random cyclic shift, a random set of subcarriers, or a random sequence, wherein the scheduling request is transmitted using the random cyclic shift, the random set of subcarriers, the random sequence, or combinations thereof.

25. The apparatus of claim 18, further comprising:
means for receiving an indication of at least one of a cyclic shift, a set of subcarriers, or a sequence index from the base station, wherein the scheduling request is transmitted using the cyclic shift, the set of subcarriers, the sequence index, or combinations thereof.

26. The apparatus of claim 18, further comprising:
means for identifying a frequency region associated with the RACH, wherein the scheduling request is transmitted using resources located within the frequency region associated with the RACH.

27. The apparatus of claim 26, further comprising:
means for determining that a length of a sleep period of the DRX configuration is greater than a threshold, wherein the scheduling request is transmitted using the resources located within the frequency region associated with the RACH based at least in part on the determination that the length of the sleep period is greater than the threshold.

28. The apparatus of claim 18, further comprising:
means for identifying a frequency region associated with the RACH and a frequency region associated with scheduling requests that does not overlap with the frequency region associated with the RACH, wherein the scheduling request is transmitted using resources located within the frequency region associated with scheduling requests based at least in part on a sleep period of the DRX configuration.

29. The apparatus of claim 28, further comprising:
means for determining that a length of the sleep period is less than a threshold, wherein the scheduling request is transmitted using the resources located within the frequency region associated with scheduling requests based at least in part on the determination that the length of the sleep period is less than the threshold.

30. An apparatus for wireless communication comprising:
means for configuring a user equipment (UE) with a discontinuous reception (DRX) configuration;
means for identifying a time period associated with a random access channel (RACH) following a sleep period of the DRX configuration; and
means for receiving a scheduling request from the UE during the time period associated with the RACH.

31. The apparatus of claim 30, further comprising:
means for transmitting a directional synchronization subframe to the UE, wherein a resource associated with the scheduling request is associated with the received directional synchronization subframe.

32. The apparatus of claim 30, further comprising:
means for transmitting an indication of at least one of a cyclic shift, a set of subcarriers, or a sequence index to the UE, wherein the scheduling request is received using the cyclic shift, the set of subcarriers, the sequence index, or combinations thereof.

33. The apparatus of claim 30, further comprising:
means for identifying a frequency region associated with the RACH, wherein the scheduling request is received using resources located within the frequency region associated with the RACH.

34. The apparatus of claim 30, further comprising:
means for identifying a frequency region associated with the RACH and a frequency region associated with scheduling requests that does not overlap with the frequency region associated with the RACH, wherein the scheduling request is transmitted using resources located within the frequency region associated with scheduling requests based at least in part on the sleep period of the DRX configuration.

35. An apparatus for wireless communication, comprising:
a processor;
memory in electronic communication with the processor; and
instructions stored in the memory and operable, when executed by the processor, to cause the apparatus to:
enter a sleep mode of a discontinuous reception (DRX) configuration; identify that a scheduling request is to be transmitted to a base station;
identify a time period associated with a random access channel (RACH); and
transmit the scheduling request to the base station during the time period associated with the RACH.

36. The apparatus of claim 35, wherein the instructions are operable to cause the apparatus to:
enter an active mode of the DRX configuration, wherein the scheduling request is transmitted during the active mode.

37. The apparatus of claim 35, wherein the instructions are operable to cause the apparatus to:
receive a directional synchronization subframe from the base station, wherein a resource associated with the scheduling request is identified based at least in part on the received directional synchronization subframe.

38. The apparatus of claim 37, wherein the resource associated with the scheduling request comprises a symbol index, a set of subcarriers, or a combination thereof.

39. The apparatus of claim 37, wherein the instructions are operable to cause the apparatus to:
identify the directional synchronization subframe from a set of directional subframes transmitted by the base station based at least in part on a signal strength of the directional synchronization subframe.

40. The apparatus of claim 35, wherein the instructions are operable to cause the apparatus to:
receive a directional synchronization subframe from the base station, wherein a resource associated with the RACH is identified based at least in part on the received directional synchronization subframe.

41. The apparatus of claim 35, wherein the instructions are operable to cause the apparatus to:
select at least one of a random cyclic shift, a random set of subcarriers, or a random sequence, wherein the scheduling request is transmitted using the random cyclic shift, the random set of subcarriers, the random sequence, or combinations thereof.

42. The apparatus of claim 35, wherein the instructions are operable to cause the apparatus to:
receive an indication of at least one of a cyclic shift, a set of subcarriers, or a sequence index from the base station, wherein the scheduling request is transmitted using the cyclic shift, the set of subcarriers, the sequence index, or combinations thereof.

43. The apparatus of claim 35, wherein the instructions are operable to cause the apparatus to:
identify a frequency region associated with the RACH, wherein the scheduling request is transmitted using resources located within the frequency region associated with the RACH.

44. The apparatus of claim 43, wherein the instructions are operable to cause the apparatus to:
determine that a length of a sleep period of the DRX configuration is greater than a threshold, wherein the scheduling request is transmitted using the resources located within the frequency region associated with the RACH based at least in part on the determination that the length of the sleep period is greater than the threshold.

45. The apparatus of claim 35, wherein the instructions are operable to cause the apparatus to:
identify a frequency region associated with the RACH and a frequency region associated with scheduling request that does not overlap with the frequency region associated with the RACH, wherein the scheduling request is transmitted using resources located within the frequency region associated with scheduling request based at least in part on a sleep period of the DRX configuration.

46. The apparatus of claim 45, wherein the instructions are operable to cause the apparatus to:
determine that a length of the sleep period is less than a threshold, wherein the scheduling request is transmitted using the resources located within the frequency region associated with scheduling requests based at least in part on the determination that the length of the sleep period is less than the threshold.

47. An apparatus for wireless communication, comprising:
a processor;
memory in electronic communication with the processor; and
instructions stored in the memory and operable, when executed by the processor, to cause the apparatus to:
configure a user equipment (UE) with a discontinuous reception (DRX) configuration; identify a time period associated with a random access channel (RACH) following a sleep period of the DRX configuration; and
receive a scheduling request from the UE during the time period associated with the RACH.

48. The apparatus of claim 47, wherein the instructions are operable to cause the apparatus to:
transmit a directional synchronization subframe to the UE, wherein a resource associated with the scheduling request is associated with the received directional synchronization subframe.

49. The apparatus of claim 47, wherein the instructions are operable to cause the apparatus to:
transmit an indication of at least one of a cyclic shift, a set of subcarriers, or a sequence index to the UE, wherein the scheduling request is received using the cyclic shift, the set of subcarriers, the sequence index, or combinations thereof.

50. The apparatus of claim 47, wherein the instructions are operable to cause the apparatus to:
identify a frequency region associated with the RACH, wherein the scheduling request is received using resources located within the frequency region associated with the RACH.

51. The apparatus of claim 47, wherein the instructions are operable to cause the apparatus to:
identify a frequency region associated with the RACH and a frequency region associated with scheduling requests that does not overlap with the frequency region associated with the RACH, wherein the scheduling request is transmitted using resources located within the frequency region associated with scheduling requests based at least in part on the sleep period of the DRX configuration.

52. A non-transitory computer-readable medium storing code for wireless communication, the code comprising instructions executable to:
enter a sleep mode of a discontinuous reception (DRX) configuration;
identify that a scheduling request is to be transmitted to a base station;
identify a time period associated with a random access channel (RACH); and
transmit the scheduling request to the base station during the time period associated with the RACH.

53. The non-transitory computer-readable medium of claim 52, wherein the instructions are executable to:
enter an active mode of the DRX configuration, wherein the scheduling request is transmitted during the active mode.

54. The non-transitory computer-readable medium of claim 52, wherein the instructions are executable to:
receive a directional synchronization subframe from the base station, wherein a resource associated with the scheduling request is identified based at least in part on the received directional synchronization subframe.

55. The non-transitory computer-readable medium of claim 54, wherein the resource associated with the scheduling request comprises a symbol index, a set of subcarriers, or a combination thereof.

56. The non-transitory computer-readable medium of claim 54, wherein the instructions are executable to:
identify the directional synchronization subframe from a set of directional subframes transmitted by the base station based at least in part on a signal strength of the directional synchronization subframe.

57. The non-transitory computer-readable medium of claim 52, wherein the instructions are executable to:
receive a directional synchronization subframe from the base station, wherein a resource associated with the RACH is identified based at least in part on the received directional synchronization subframe.

58. The non-transitory computer-readable medium of claim 52, wherein the instructions are executable to:
select at least one of a random cyclic shift, a random set of subcarriers, or a random sequence, wherein the scheduling request is transmitted using the random cyclic shift, the random set of subcarriers, the random sequence, or combinations thereof.

59. The non-transitory computer-readable medium of claim 52, wherein the instructions are executable to:
receive an indication of at least one of a cyclic shift, a set of subcarriers, or a sequence index from the base station, wherein the scheduling request is transmitted using the cyclic shift, the set of subcarriers, the sequence index, or combinations thereof.

60. The non-transitory computer-readable medium of claim 52, wherein the instructions are executable to:
identify a frequency region associated with the RACH, wherein the scheduling request is transmitted using resources located within the frequency region associated with the RACH.

61. The non-transitory computer-readable medium of claim 60, wherein the instructions are executable to:
determine that a length of a sleep period of the DRX configuration is greater than a threshold, wherein the scheduling request is transmitted using the resources located within the frequency region associated with the RACH based at least in part on the determination that the length of the sleep period is greater than the threshold.

62. The non-transitory computer-readable medium of claim 52, wherein the instructions are executable to:
identify a frequency region associated with the RACH and a frequency region associated with scheduling requests that does not overlap with the frequency region associated with the RACH, wherein the scheduling request is transmitted using resources located within the frequency region associated with scheduling requests based at least in part on a sleep period of the DRX configuration.

63. The non-transitory computer-readable medium of claim 62, wherein the instructions are executable to:
determine that a length of the sleep period is less than a threshold, wherein the scheduling request is transmitted using the resources located within the frequency region associated with scheduling requests based at least in part on the determination that the length of the sleep period is less than the threshold.

64. A non-transitory computer-readable medium storing code for wireless communication, the code comprising instructions executable to:
configure a user equipment (UE) with a discontinuous reception (DRX) configuration;
identify a time period associated with a random access channel (RACH) following a sleep period of the DRX configuration; and
receive a scheduling request from the UE during the time period associated with the RACH.

65. The non-transitory computer-readable medium of claim 64, wherein the instructions are executable to:
transmit a directional synchronization subframe to the UE, wherein a resource associated with the scheduling request is associated with the received directional synchronization subframe.

66. The non-transitory computer-readable medium of claim 64, wherein the instructions are executable to:
transmit an indication of at least one of a cyclic shift, a set of subcarriers, or a sequence index to the UE, wherein the scheduling request is received using the cyclic shift, the set of subcarriers, the sequence index, or combinations thereof.

67. The non-transitory computer-readable medium of claim 64, wherein the instructions are executable to:
identify a frequency region associated with the RACH, wherein the scheduling request is received using resources located within the frequency region associated with the RACH.

68. The non-transitory computer-readable medium of claim 64, wherein the instructions are executable to:
identify a frequency region associated with the RACH and a frequency region associated with scheduling requests that does not overlap with the frequency region associated with the RACH, wherein the scheduling request is transmitted using resources located within the frequency region associated with scheduling requests based at least in part on the sleep period of the DRX configuration.

* * * * *